United States Patent
Sugumaran et al.

(10) Patent No.: US 10,095,235 B2
(45) Date of Patent: Oct. 9, 2018

(54) UAV-BASED SENSING FOR WORKSITE OPERATIONS

(71) Applicant: Deere & Company, Moline, IL (US)

(72) Inventors: Ramanathan Sugumaran, Bettendorf, IA (US); Noel W. Anderson, Fargo, ND (US); Bradley J. Hitchler, Baxter, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/650,115

(22) Filed: Jul. 14, 2017

(65) Prior Publication Data

US 2017/0315555 A1 Nov. 2, 2017

Related U.S. Application Data

(63) Continuation of application No. 14/813,573, filed on Jul. 30, 2015, now Pat. No. 9,740,208.

(51) Int. Cl.
*G05B 1/02* (2006.01)
*G05D 1/02* (2006.01)
(Continued)

(52) U.S. Cl.
CPC ......... *G05D 1/0219* (2013.01); *A01B 79/005* (2013.01); *B64C 39/024* (2013.01);
(Continued)

(58) Field of Classification Search
CPC ......... G05D 1/0246; G05D 2201/0201; G05D 1/0094; G05D 1/0278; G05D 2201/0207;
(Continued)

(56) References Cited

U.S. PATENT DOCUMENTS

| 4,015,366 A | 4/1977 | Hall, III |
| 5,668,719 A | 3/1997 | Bobrov et al. |

(Continued)

FOREIGN PATENT DOCUMENTS

| CN | 202953175 U | 5/2013 |
| CN | 203528823 U | 4/2014 |

(Continued)

OTHER PUBLICATIONS

New Hagie STS Sprayer Features AirScout Precision Package. Posted by: Matthew J. Grassi | Jul. 8, 2015. http://www.croplife.com/equipment/new-hagie-sts-sprayer-features-airscout-precision-package/. 3 pages.

(Continued)

*Primary Examiner* — Dalena Tran
(74) *Attorney, Agent, or Firm* — Joseph R. Kelly; Kelly, Holt & Christenson PLLC

(57) ABSTRACT

A mobile machine includes controllable mechanism that performs a prescribed operation on a worksite as the mobile machine travels over the worksite in a direction of travel, and a communication system that receives attribute data indicative of an attribute corresponding to the worksite, and that receives effect data indicative of an effect of the prescribed operation being performed on the worksite. The mobile machine may further include a control system that generates a difference map indicative of a difference between the attribute data and the effect data, and that controls the controllable mechanism to adjust performance of the prescribed operation on the worksite, based on the difference.

20 Claims, 18 Drawing Sheets

(51) Int. Cl.
  *B64C 39/02* (2006.01)
  *G05D 1/00* (2006.01)
  *A01B 79/00* (2006.01)

(52) U.S. Cl.
  CPC ......... *G05D 1/0094* (2013.01); *G05D 1/0246* (2013.01); *H05K 999/99* (2013.01); *B64C 2201/123* (2013.01); *G05D 2201/0201* (2013.01); *G05D 2201/0202* (2013.01)

(58) Field of Classification Search
  CPC ... A01B 79/005; A01B 69/008; A01C 21/007; G06F 17/30241
  USPC ............... 701/50; 348/144; 340/3.9, 426.13, 340/539.11
  See application file for complete search history.

(56) References Cited

U.S. PATENT DOCUMENTS

| | | | |
|---|---|---|---|
| 5,699,244 A | 12/1997 | Clark, Jr. et al. | |
| 5,902,343 A * | 5/1999 | Hale | A01B 79/005 342/357.52 |
| 5,995,895 A * | 11/1999 | Watt | A01B 79/005 56/10.2 G |
| 6,178,253 B1 * | 1/2001 | Hendrickson | G01J 3/2803 348/144 |
| 6,883,892 B2 | 4/2005 | Sievert | |
| 8,208,680 B2 | 6/2012 | Scharf | |
| 8,319,165 B2 | 11/2012 | Holland | |
| 8,594,897 B2 | 11/2013 | Motavalli et al. | |
| 8,897,973 B2 | 11/2014 | Hunt et al. | |
| 9,076,105 B2 | 7/2015 | Anderson | |
| 2001/0016053 A1 | 8/2001 | Dickson et al. | |
| 2002/0022928 A1 | 2/2002 | Ell | |
| 2003/0130767 A1 | 7/2003 | Carroll | |
| 2005/0185552 A1 | 7/2005 | Clyde Fraisse et al. | |
| 2006/0106539 A1 | 5/2006 | Choate et al. | |
| 2007/0019254 A1 | 1/2007 | Zeng | |
| 2007/0091137 A1 | 4/2007 | Lopez | |
| 2008/0140431 A1 | 6/2008 | Anderson | |
| 2011/0313666 A1 | 12/2011 | Hirvi et al. | |
| 2012/0083907 A1 | 4/2012 | Motavalli et al. | |
| 2012/0101861 A1 | 4/2012 | Lindores | |
| 2012/0109614 A1 | 5/2012 | Lindores | |
| 2012/0195496 A1 | 8/2012 | Zaman | |
| 2014/0012732 A1 * | 1/2014 | Lindores | A01B 79/005 705/37 |
| 2014/0035752 A1 | 2/2014 | Johnson | |
| 2014/0263822 A1 | 9/2014 | Malveaux | |
| 2015/0243114 A1 * | 8/2015 | Tanabe | G07C 5/008 701/123 |
| 2016/0093212 A1 | 3/2016 | Barfield, Jr. et al. | |

FOREIGN PATENT DOCUMENTS

| | | |
|---|---|---|
| DE | 4340096 A1 | 11/1993 |
| WO | 0008590 A1 | 2/2000 |

OTHER PUBLICATIONS

GB1600139.8 Search Report under Section 17(5) dated Jun. 15, 2016. 1 page.
Evaluation of Image Analysis to Determine the N-Fertilizer Demand of Broccoli Plants. May 26, 2008, 9 pages.
W. Brien Henry et al., "Remote Sensing to Distinguish Soybean from Weeds After Herbicide Application", Weed Technology 2004, vol. 18:594-604. 11 pages.
University of Nebraska Lincoln Extension EC708. Precision Agriculture "Weed Targeting Herbicide Management"© 2008, The Board of Regents of the University of Nebraska on behalf of the University of Nebraska—Lincoln Extension. All rights reserved. 6 pages.
U.S. Appl. No. 14/589,347, filed Jan. 5, 2015 System and Method for Analyzing the Effectiveness of an Applciation to a Crop. 23 pages.
"Prosceution History of Co-Pending U.S. Appl. No. 14/813,573" filed Jul. 30, 2015 entitled "UAV-Based Senssing for Worksite Operations".

* cited by examiner

UAV-BASED SENSING FOR WORKSITE OPERATIONS

CROSS-REFERENCE TO RELATED APPLICATION

The present application is a continuation of co-pending non-provisional U.S. patent application Ser. No. 14/813,573, filed Jul. 30, 2015 entitled "UAV-BASED SENSING FOR WORKSITE OPERATIONS." The present application makes reference to U.S. patent application Ser. No. 14/589,347, filed Jan. 5, 2015 entitled "SYSTEM AND METHOD FOR ANALYZING THE EFFECTIVENESS OF AN APPLICATION TO A CROP".

FIELD OF THE DESCRIPTION

The present description deals with worksite operations. More specifically, the present description deals with using an unmanned aerial vehicle (UAV) to gather data for use in controlling worksite operations.

BACKGROUND

There are a wide variety of different types of mobile machines. These types of machines can include agricultural machines, turf care machines, forestry machines, construction machines, etc. The machines are used in performing a wide variety of functions in worksite operations.

One example includes agricultural machines. Site-specific farming refers to performing crop care functions, only where needed within a field. Therefore, some work has been done in sensing attributes of a field, and correlating them with geographic location, in order to generate maps between sensed attributes and their location in a field. Some such systems sense attributes in a field by using remote images that are captured by either aircraft or satellite platforms. Other approaches have used cameras on ground-engaging machines to capture images.

The discussion above is merely provided for general background information and is not intended to be used as an aid in determining the scope of the claimed subject matter.

SUMMARY

A mobile machine includes controllable mechanism that performs a prescribed operation on a worksite as the mobile machine travels over the worksite in a direction of travel, and a communication system that receives attribute data indicative of an attribute corresponding to the worksite, and that receives effect data indicative of an effect of the prescribed operation being performed on the worksite. The mobile machine may further include a control system that generates a difference map indicative of a difference between the attribute data and the effect data, and that controls the controllable mechanism to adjust performance of the prescribed operation on the worksite, based on the difference.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
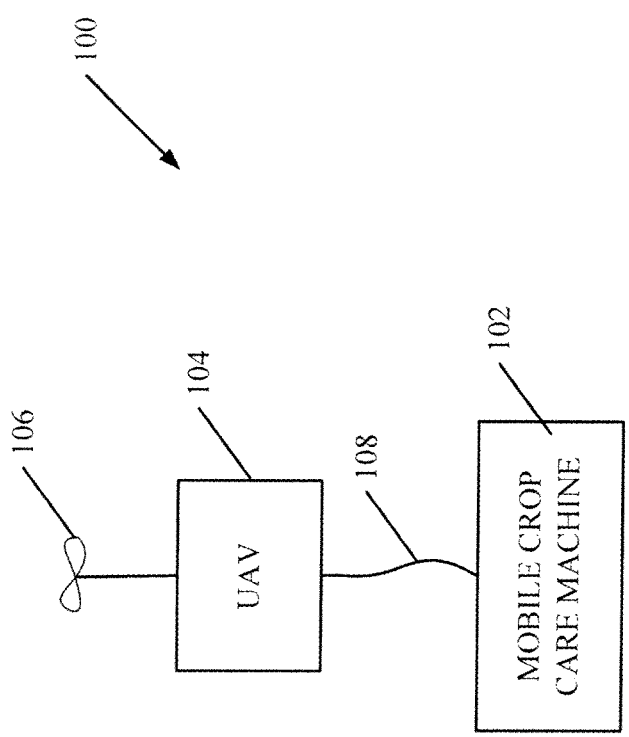
FIG. 1 is a block diagram of one example of a crop care machine architecture.

FIG. 1 is a block diagram of one example of a crop care machine architecture 100. It will be appreciated that architecture 100 could be an architecture in which another kind of machine is used, such as a machine used in construction, turf care, forestry, or another agricultural machine, etc. It is described herein as a crop care machine architecture for the sake of example only.

Architecture 100 illustratively includes a crop care machine 102 and an unmanned aerial vehicle (UAV) 104. UAV 104 illustratively includes a propulsion mechanism 106, such as one or more rotors that are driven by one or more motors. In the example shown in FIG. 1, UAV 104 is coupled to mobile crop care machine 102 by link 108. In one example, link 108 is a mechanical tether that provides a power link from machine 102 to UAV 104, in order to power UAV 104. Link 108 also illustratively provides a communication link between machine 102 and UAV 104 so that UAV 104 can provide sensor data (indicative of sensed values that are sensed by sensors on UAV 104) back to machine 102. It can also illustratively provide geographical information to indicate the relative positions of machine 102 and UAV 104, and it can carry control signals by which a controller on machine 102 can control UAV 104, or vice versa.

In one example, machine 102 travels over a worksite (such as a field). UAV 104 illustratively flies in proximity to machine 102, sensing one or more attributes of the worksite. Attribute indicators, that indicate the sensed attributes, are provided to machine 102, so that machine 102 can control its own operation (or the operation of other machines) based on the sensed attributes. Also, any number of metrics can be calculated based on the sensed attribute and provided to other machines or other analysis systems.

It will be noted that, while some of the present discussion proceeds with respect to machine 102 being a sprayer for applying chemicals to a crop or field, machine 102 can be any of a wide variety of different types of machines. For instance, it can be a planter, a harvester, a tillage machine, or a wide variety of other machines. It will also be noted that, in architecture 100, UAV 104 can fly in a forward direction relative to machine 102 and send back data that can be used by machine 102 to perform its operations. In another example, UAV 104 can fly behind machine 102 and send information to machine 102 indicative of how the operation performed by machine 102 was actually performed (e.g., indicative of the quality of the operation performed by machine 102). In yet another example, UAV 104 can fly both forward of, and rearward of, machine 102, alternately. Thus, for instance, UAV 104 can first fly forward of machine 102 sensing a given attribute of the crop or field and providing that information to machine 102 so that machine 102 can adjust its operation. It can then fly rearward of machine 102 to sense how well machine 102 actually performed its operation, and provide that information back to machine 102. Machine 102 can adjust its operation, if needed. In yet another example, there are multiple UAVs 104 linked to machine 102 so that some can fly forward of machine 102, some can fly rearward of machine 102, etc.

Figure 2:
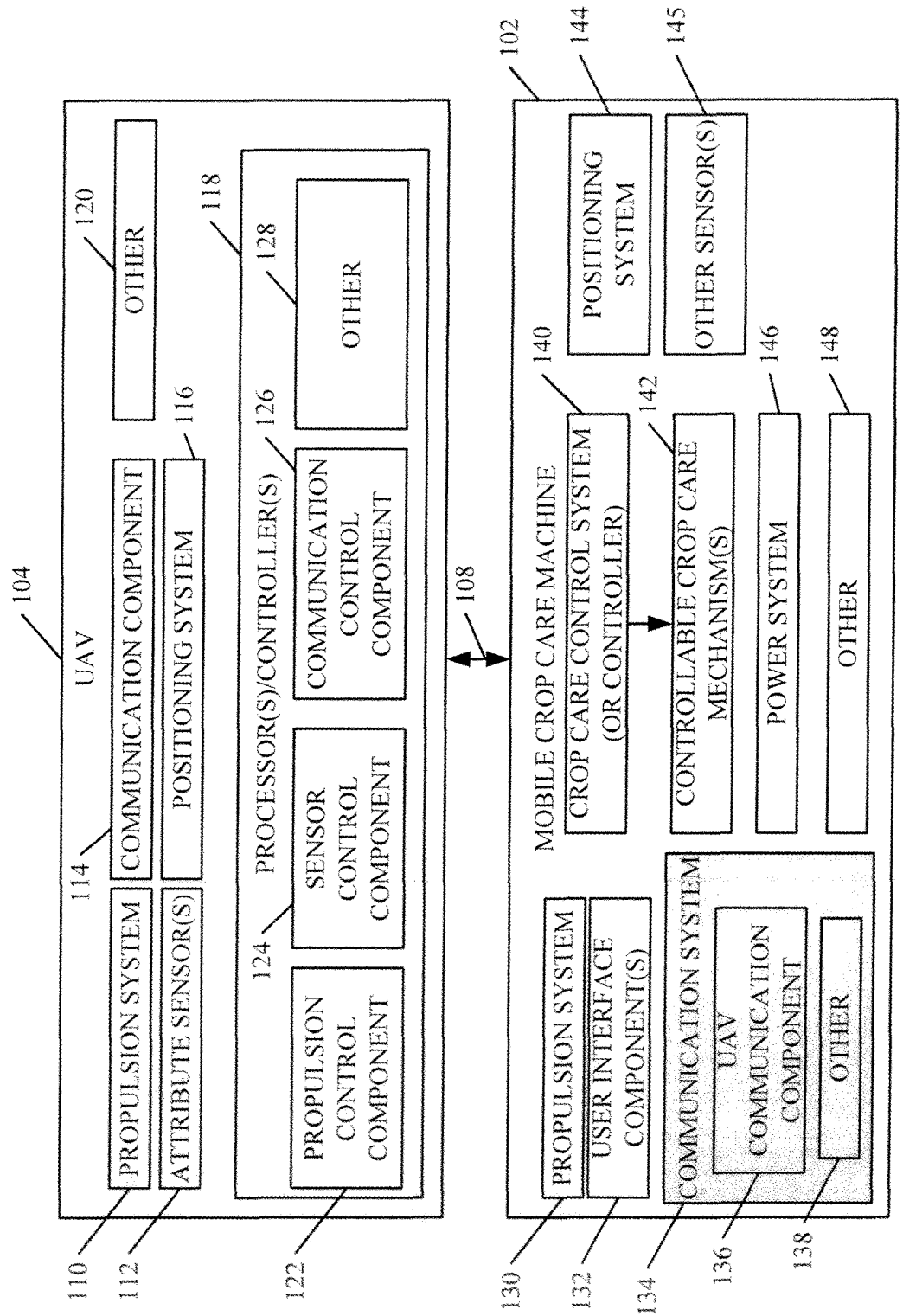
FIG. 2 is a more detailed block diagram of one example of the crop care machine architecture shown in FIG. 1.

Before describing any of these examples in more detail, a more detailed description of one example of machine 102 and UAV 104 will first be provided. FIG. 2 is a block diagram illustrating one example of the crop care machine architecture 100 (shown in FIG. 1) in more detail. In the example shown in FIG. 2, UAV 104 can have propulsion system 110 that drives rotors 106, one or more attribute sensors 112, communication component 114, positioning system 116, and a set or processors or controllers 118. It can have other items 120 as well. Processors or controllers 118 can include a propulsion control component 122, sensor control component 124, communication control component 126, and it can include other items 128.

The example shown in FIG. 2 illustrates that mobile crop care machine 102 can have its own propulsion system 130, one or more user interface components 132, and communication system 134 (which can include UAV communication component 136 and other communication components 138). Machine 102 can have crop care control system (or controller) 140 (which can output control signals to control a set of controllable crop care mechanisms 142) positioning system 144, a variety of other sensors 145, power system 146, and it can include other items 148). Before describing the overall operation of architecture 100 in more detail, a brief overview will first be provided.

Again, mobile crop care machine 102 will be described in some examples as a sprayer. However, crop care machines can include a wide variety or other machines as well. They can include, for instance, self-propelled sprayers, towed sprayers, mechanical weeders, laser weed killers, fertilizer applicators, planting machines, harvesters, and a wide variety of other machines.

Therefore propulsion system 130 can be any propulsion system which is suitable to the particular machine. Power system 146 can be a system that provides power to machine 102 and also to UAV 104. However, machine 102 can also be powered by a separate power system from UAV 104. In one example, for instance, it includes an engine with a transmission that drives ground-engaging mechanisms (such as wheels, tracks, etc.). User interface components 132 can be a wide variety of user interface components that allow a user to interface with the other portions of machine 102. For instance, they can include levers, switches, wheels, joysticks, buttons, a steering wheel, pedals, etc. They can also include microphones with speech recognition systems and natural language processing systems, to process speech inputs. They can include user input mechanisms that can be actuated from a user interface display. For instance, they can be icons, links, drop down menus, radio buttons, text boxes, or a wide variety of other user input mechanisms that can be actuated by a user, on a user interface display screen. The user input mechanisms can be actuated to control and manipulate mobile crop care machine 102 or UAV 104, or both.

Crop care controller 140 illustratively receives information from UAV 104, and it can receive information from a wide variety of the other sensors 145. It then generates a control signal to control controllable crop care mechanisms 142. Crop care mechanism control may include adjusting frame or ground engaging element height above ground; ground engaging element depth into or below ground, downpressure, or angle; chemical application type or rate; chemical application pattern; or other mechanism control. It can be used to control machine speed as well. In various other applications, controller 140 can control mechanisms 142 to perform a wide variety of other operations as well. Some of them include boom height, nozzle size, solution delivery systems (flow and pressure), depth control, downforce systems, surface finish of the soil (e.g., is it level and smooth), cutter height, residue distribution system (even spread of residue behind harvester by increasing spinner speed), row cleaner height (residue removal), auger positions, spout positions, machine-to-machine position, vehicle traction control system, vehicle and implement steering control, among others.

Positioning system 144 illustratively generates a position indicator indicating a position of machine 102. For instance, it can be a global position system (GPS), a dead reckoning system, a cellular triangulation system, or a wide variety of other positioning systems.

On UAV 104, propulsion system 110 illustratively powers rotors 106, or other mechanisms to provide propulsion to UAV 104. Propulsion control component 122 illustratively controls propulsion system 110. In doing so, it can illustratively control the direction, height, attitude, speed, and other characteristics of UAV 104.

Attribute sensors 112 illustratively sense one or more attributes of a field or a crop over which machine 102 is traveling. For instance, attribute sensors 112 can sense such things as soil, soil type, soil moisture, soil cover, residue density, crop type, weed presence and weed type, plant size, plant height, plant health, plant vigor, chemical presence, chemical distribution, etc. Sensors 112 can thus be a wide variety of different types of sensors, such as cameras, infrared cameras or other infrared sensors, video cameras, stereo cameras, LIDAR sensors, structured light systems, etc.

Sensor control component 124 can illustratively control attribute sensors 112. Therefore, it can illustratively control when sensor readings are taken, and it can perform signal conditioning on the sensor signals, such as linearization, normalization, amplification, etc. As is described below, it can also illustratively perform other processing on the attribute signals, or that processing can be performed by crop care controller 140 on machine 102, or the processing can be split between component 124 and component 140.

Communication component 114 illustratively communicates with mobile crop care machine 102. It can communicate by a wired communication harness when link 108 is a physically tethered harness. It can also communicate through a wireless communication link. Communication control component 126 illustratively controls communication component 114 to communicate with machine 102. It can communicate the attribute sensor signals from sensors 112, it can communicate them after they are conditioned by component 124. It can also communicate other values that are generated based on the attribute sensors, or other items in UAV 104. For instance, it can communicate the position of UAV 104 identified by positioning system 116. It can also, for example, calculate a relative offset between the position of UAV 104 and the position of machine 102, and communicate that value to machine 102. It can control the communication of a wide variety of other values or signals between UAV 104 and machine 102 as well.

Positioning system 116 illustratively generates a position indicator, indicating a position of UAV 104. As with positioning system 144, system 116 can be a GPS system, a cellular triangulation system, a dead reckoning system, or a wide variety of other types of systems. Positioning system 116 may also generate pitch, roll, or yaw indicators which indicate pitch, roll, or yaw of UAV 104.

It will also be noted that the various processing of items mentioned with respect to FIG. 2 can be performed in other locations (instead of UAV 104 or machine 102) as well. For instance, various signals or values may be transmitted to a remote location where the processing is performed. The results of the processing may be stored at the remote location or returned to architecture 100 for use within architecture 100, or both.

Figure 3:
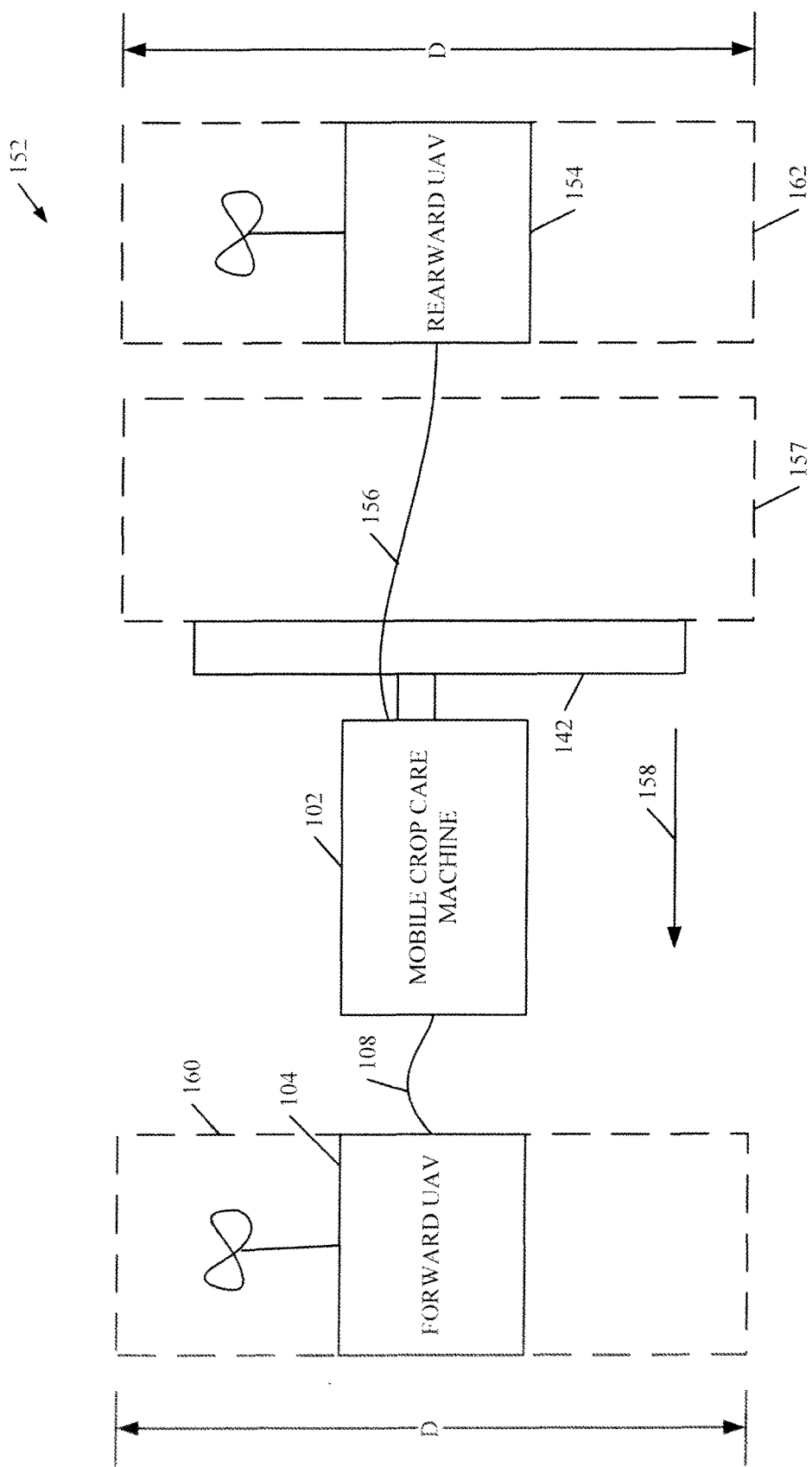
FIG. 3 is a block diagram of one example of another crop care machine architecture.

Again, before, discussing the operation of architecture 100 in more detail, another implementation of architecture 100 will first be briefly mentioned. FIG. 3 shows one example of architecture 152. Architecture 100 may be an implementation of architecture 100, or a different architecture. It can be seen in FIG. 3 that architecture 152 includes mobile crop care machine 102, UAV 104, and link 108. FIG. 3 also illustrates that machine 102 has a controllable crop care mechanism 142 that performs an operation on a portion 157 of the worksite, as machine 102 moves over the worksite in the direction indicated by arrow 158. Architecture 152 also illustratively includes another UAV 154 which can be coupled to machine 102 by link 156. Thus, in the example shown in FIG. 3, machine 102 illustratively travels across a field or worksite in a direction indicated by arrow 158. UAV 104 illustratively flies forward of machine 102, and UAV 154 illustratively flies rearward of machine 102. UAV 104 illustratively uses the one or more attribute sensors 112 disposed thereon in order acquire worksite data from a portion 160 of the worksite. UAV 154 illustratively uses its sensor to acquire worksite data from a portion 162 of the worksite, after machine 102 has passed over it.

It will of course be noted that, for UAV 104 to acquire worksite data from portion 160 of the worksite, it may need to fly back and forth in a direction generally perpendicular to the direction of travel 158, in front of machine 102. In another example, attribute sensors 112 may have a sensing field which is wide enough to cover portion 160. It yet another example, multiple UAVs 104 are used to acquire data from portion 160 ahead of machine 102.

In one example, the same is true of rearward UAV 154. Data can be acquired from portion 162 by UAV flying back and forth behind machine 102, or by deploying multiple UAVs behind machine 102. It can also acquire data with sensors that have a sensing field that is wide enough to cover portion 162.

In yet another example, a single UAV 104 is used that intermittently flies forward of machine 102, to acquire data from portion 160, and then rearward of machine 102 to acquire data from portion 162. All of these implementations are contemplated herein.

In any case, portions 160 and 162 generally have a dimension D that is similar to the corresponding dimension D of portion 157, that is being operated on by controllable mechanism 142. Therefore, as is described in greater detail below, UAV 104 can acquire data with respect to portion 160 and communicate that data back (and its location) to machine 102. Machine 102 can use the data to control the operations performed by controllable crop care mechanism 142 in portion 157, when machine 102 has moved forward in the direction 158 far enough that portion 157 is the same as portion 160. UAV 154 can then acquire data from portion 162 (again when portion 162 is the same as portion 157) to indicate the quality of the operation performed by controllable crop care mechanism 142. This can again be transmitted back to machine 102 which can perform a wide variety of different operations based on that information.

As but one concrete example, machine 102 can be a sprayer. The sprayer may be a direct injection sprayer that is capable of spraying several agricultural chemicals in different concentrations at the same time. Those chemicals may further include a marker chemical such as a dye, which is detectable by rearward UAV 154, using attribute sensors 112. UAV 104 can illustratively capture images of portion 160 in a field that machine 102 is traveling over. It can transmit that information over link 108 to machine 102. Crop care controller 140 can then identify the location and types of weeds in those images. It can control individual spray nozzles to dispense different types of chemicals, at different locations, to treat the weeds identified in portion 160, when sprayer 142 is over portion 160. UAV 154 can then identify whether the sprayer applied chemicals to the appropriate locations when it passes over the portion of the field where the chemicals were sprayed. In some instances, this is accomplished by sensing the level, presence, or absence of marker on the target locations such as on weed leaves. Of course, this operation can be continuous so that for each location in the field, the data is transmitted from UAV 104 to machine 102 and then from UAV 154 to machine 102, and correlated geographically, as machine 102 travels over the field. The operation can be performed intermittently as well.

Figure 4:
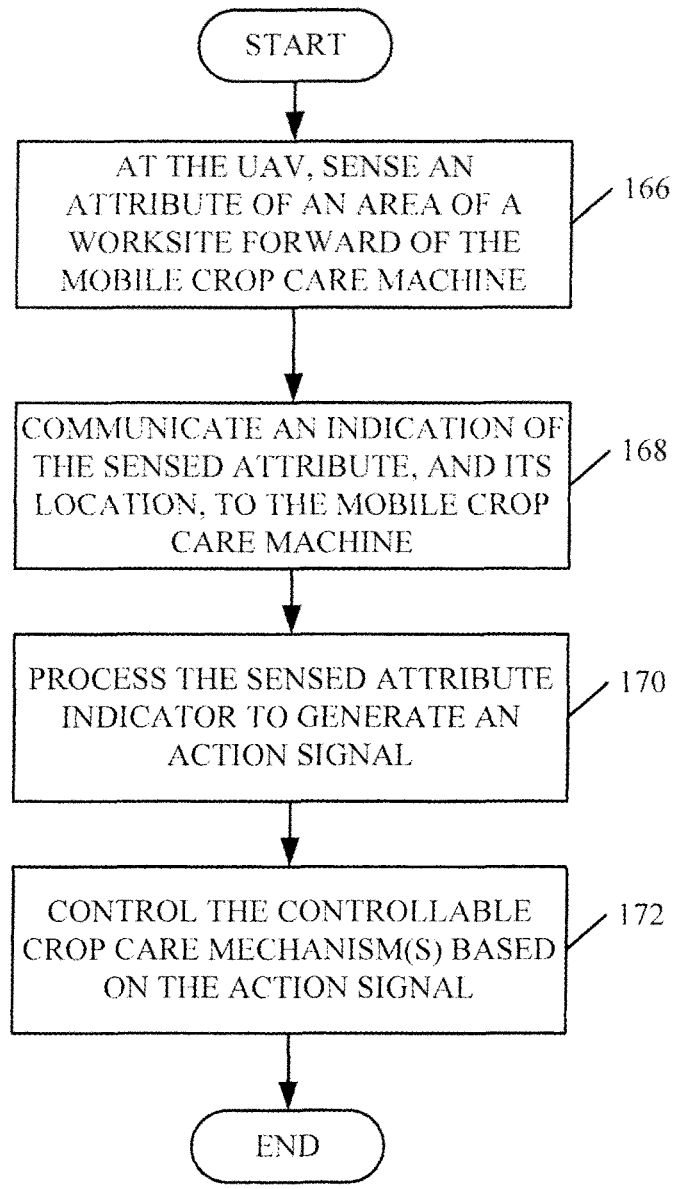
FIG. 4 is a flow diagram illustrating one example of the operation of a crop care machine architecture with an unmanned aerial vehicle operating forward of a mobile crop care machine.

The operation of architectures 100 and 152 will now be described with respect to a variety of different implementations. First, for instance, FIG. 4 is a flow diagram which illustrates the operation of architecture 100, when only a forward UAV 104 (or a set of forward UAVs) are deployed with respect to machine 102. In such an implementation, there is no rearward UAV 154.

UAV 152 thus first uses its one or more attribute sensors 112 to sense an attribute of an area of the worksite that is forward of the mobile crop care machine 102, as machine 102 is traveling in the forward direction. This is indicated by block 166 in FIG. 4. In doing so, UAV 104 can correlate the attribute signal with a position from which it is sensed, as indicated by positioning system 116.

UAV 104 then communicates an indication of the sensed attribute, and the location that it was sensed from, to mobile crop care machine 102 over link 108. This is indicated by block 168. Crop care controller 140 on machine 102 then processes the sensed attribute indicator to generate an action signal. This is indicated by block 170. For instance, when machine 102 is a sprayer, crop care controller 140 can generate a spraying prescription that prescribes one or more chemicals (such as the chemical type, the chemical concentration and its location of application).

Crop care controller 140 then illustratively controls the controllable crop care mechanisms 142, based upon the action signal. This is indicated by block 172. For instance, using the spraying prescription, and the location information provided by positioning system 144, crop care controller 140 can control individual actuators (such as spray pumps, valves, nozzles, etc.) on mechanism 142 in order to apply chemicals to conform to the prescription that was provided for the current geographic location of the sprayer. It can thus control mechanisms 142 to apply a particular chemical, of a particular chemical type, in a particular chemical concentration, at a desired location of application.

In some examples, attribute sensor 112 may be a camera or another image capture mechanism that captures an image of the portion 160 of the field or worksite. Images may be two dimensional or three dimensional. Images may be from electromagnetic radiation reflected by, emitted from, or transmitted through, an object. Images may comprise alone or in combination electromagnetic radiation intensity, wavelength, band time of flight, phase shift, or any other suitable image parameter. In such an implementation, crop care 140 illustratively processes the image to identify weeds. The image processing may use a wide variety of different types of techniques, such as leaf spectral reflection characteristics, shape (or morphology) or other features to identify crop and weed species. Plant size may be estimated using pixel width in field of view, stereo imaging, time-of-flight reflectance, structural light, or other processes or mechanisms. These or other parameters can be used in generating the prescription, by selecting the chemical type and concentration (or dosing). In such an implementation, the chemicals may be different types of herbicides.

Also, in one implementation, the chemical concentration may vary across the width of the area being treated by machine 102. It may also vary with the distance traveled by machine 102.

In another example, the image captured by UAV 104 may be processed to determine plant health or vigor. Instead of the prescription being to apply a herbicide, the chemicals may comprise nutrients, such as nitrogen, phosphorus, potassium, micro-nutrients, such as sulfur, iron, etc., soil pH modifiers, such as lime, among a wide variety of other chemicals.

Figure 5:
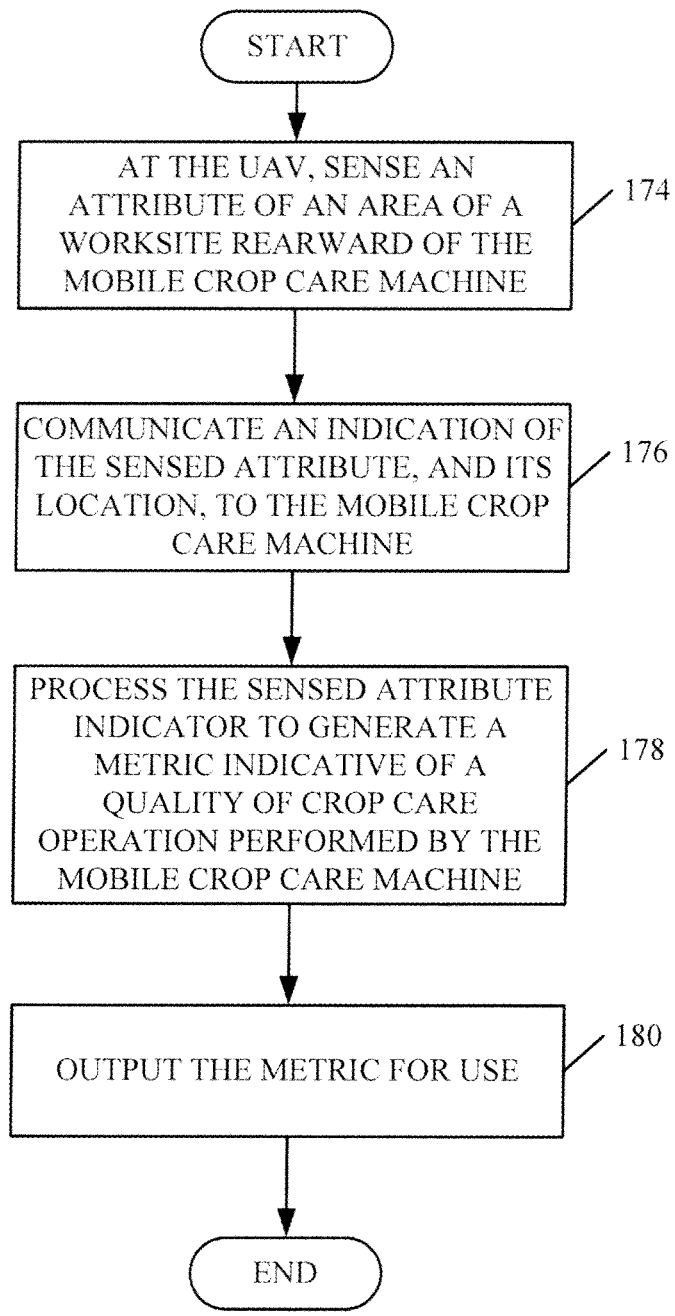
FIG. 5 is a flow diagram illustrating one example of the operation of a crop care machine architecture with an unmanned aerial vehicle operating rearward of a mobile crop care machine.

In still another example, the image can be processed to determine the presence and severity of pests and diseases. In that case, the prescription can be to prescribe chemicals that may include pesticides, insecticides, fungicides, nematicides, etc. FIG. 5 is a flow diagram illustrating one example of the operation of architecture 100, where only a rearward UAV 154 is deployed. In such an implementation, there is no forward UAV 104.

In the implementation described with respect to FIG. 5, UAV 154 first senses an attribute of an area of a worksite that is rearward of mobile crop care machine 102. This is indicated by block 174 in FIG. 5. It then communicates an indication of the sensed attribute, and its location, to machine 102. This is indicated by block 176. Crop care controller 140 then processes the sensed attribute indicator to generate a metric indicative of a quality of crop care operation performed by the mobile crop care machine 102 (and controllable mechanism 142) at that geographic location. This is indicated by block 178. Controller 140 can output the metric for use in various ways. A number of the ways will be described in greater detail below. Outputting the metric for use is indicated by block 180.

In the implementation described with respect to FIG. 5 (again where the example of machine 102 is a sprayer), the prescription may be an a priori prescription, or it may be derived from sensor data that is obtained from vehicle mounted workspace sensors 145. In such an implementation, rearward UAV 154 is used to monitor the quality of application of the chemical, and optionally to perform touch-up spraying (as is described in greater detail below).

Figure 6:
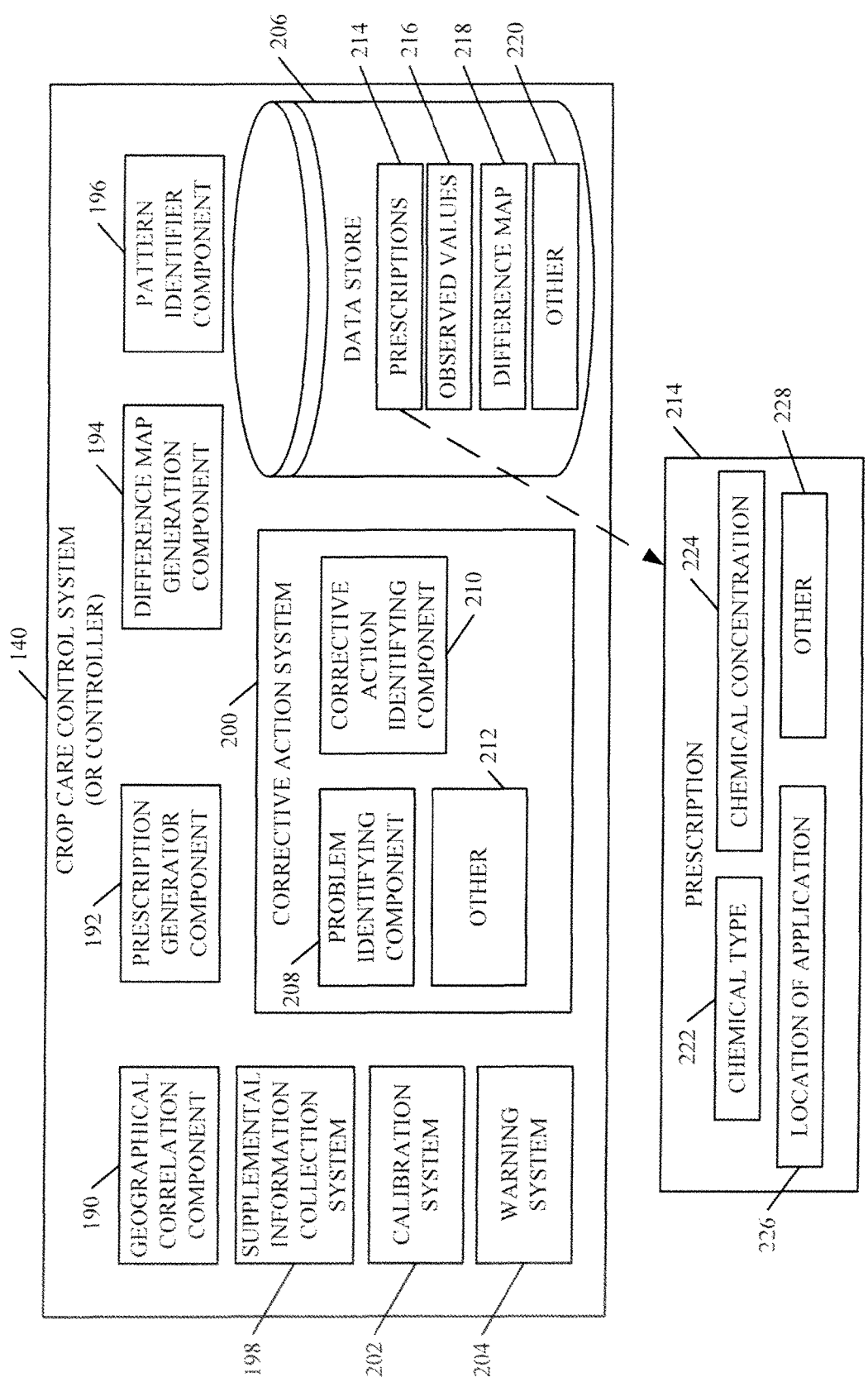
FIG. 6 is a block diagram of one example of a crop care controller, in more detail.

Before describing yet another implementation, in which both forward UAV 104 and rearward UAV 154 are present, a more detailed description of one example of crop care controller 140 will first be provided. FIG. 6 shows a more detailed block diagram of one example of crop care controller 140. In the example shown in FIG. 6, controller 140 illustratively includes geographical correlation component 190, prescription generator component 192, and difference map generation component 194. It can include pattern identifier component 196, supplemental information collection system 198, and corrective action system 200. It can also illustratively include a calibration system 202, one or more warning/notification generator components 204, and data store 206.

In the example shown in FIG. 6, corrective action system 200 illustratively includes problem identifying component 208, corrective action identifying component 210, and it can include other items 212. Data store 206 can include one or more prescriptions 214, a set of observed values 216, one or more difference maps 218, and it can include other items 220.

In the example described with respect to FIG. 6, mobile crop care machine 102 is illustratively applying one or more chemicals to a field. Therefore, each prescription 214 can include a chemical type 222, a chemical concentration 224, a location of application 226, and it can include a wide variety of other information 228.

Figure 7:
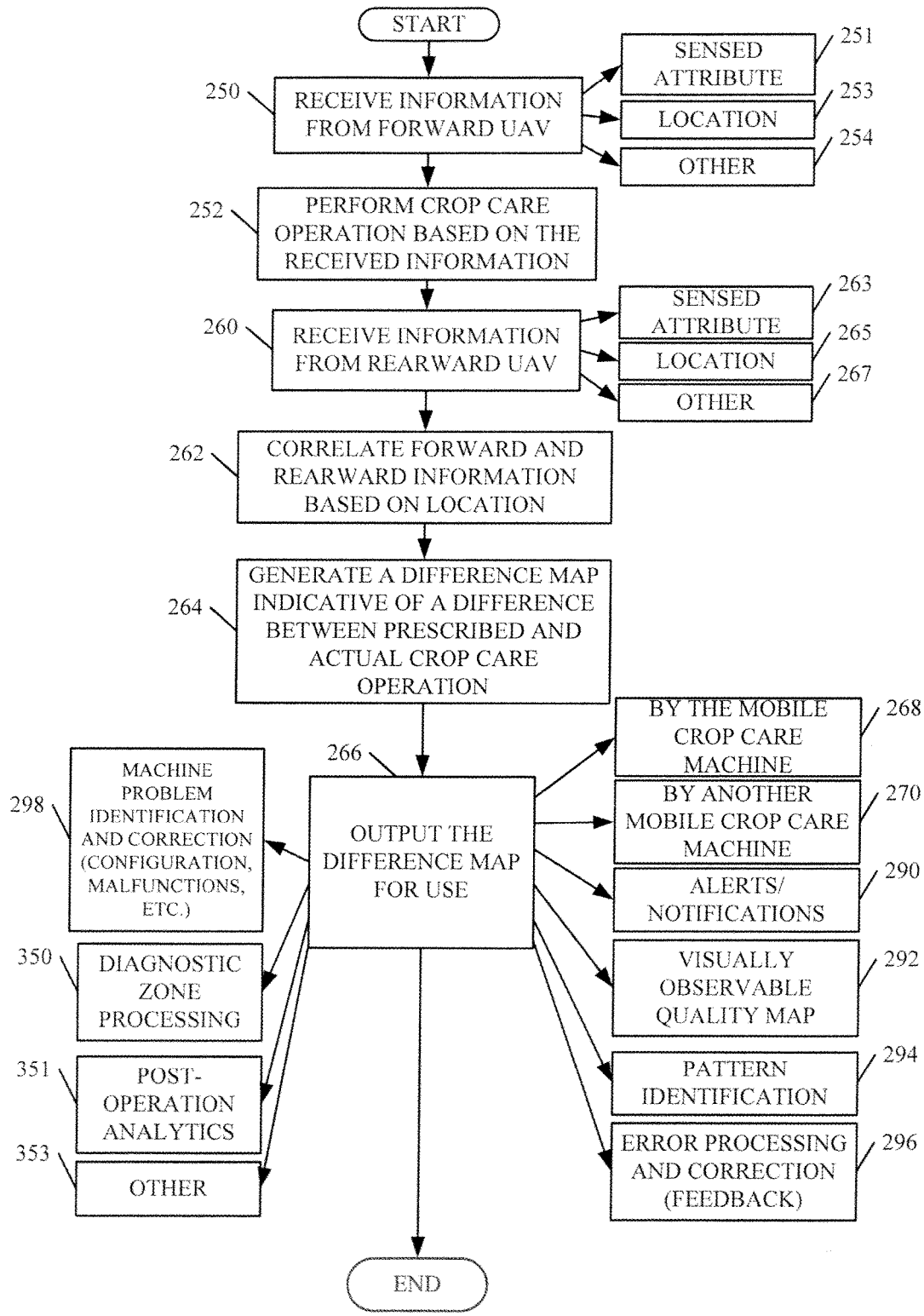
FIG. 7 is a flow diagram illustrating one example of the operation of the crop care machine architecture shown in FIG. 3, in more detail.

FIG. 7 is a flow diagram illustrating one example of the operation of architecture 152 shown in FIG. 3 using a crop care controller 140 such as that described with respect to FIG. 6. It will also be noted that, instead of having both a forward flying UAV 104 and a rearward UAV 154, the same architecture can be implemented using a single UAV that alternately flies ahead of, and behind, mobile crop care machine 102. Further, it can be implemented using multiple forward and rearward UAVs.

Mobile crop care machine 102 first receives information from forward UAV 104. This is indicated by block 250 in FIG. 7. This can be carried out, for example, according to the operation described above with respect to FIG. 4. Receiving information from the forward UAV 104 can take a wide variety of different forms. It can include the sensed attribute as indicated by block 251, the location where the sensed, attribute was sensed as indicated by block 253, and it can include other items 254.

Prescription generator component 192 then generates a prescription, and machine 102 then performs the crop care operation by controlling controllable mechanisms 142 based upon the information received from forward UAV 104 (e.g., based on the prescription). This is indicated by block 252. For example, where machine 102 is a sprayer, it can apply chemicals of a certain chemical type and concentration at various locations, according to the prescription. Where multiple chemicals are involved, or multiple concentrations, each of them may have a unique chemical marker which allows its as-applied pattern to be detected by the attribute sensors 112 in the rearward flying UAV 154. Thus, rearward UAV 154 senses information and provides it to mobile crop care machine 102 over link 156. This is indicated by block 260 in FIG. 7.

Receiving information from rearward UAV 154 can also take a wide variety of forms. The information can be the sensed attribute itself, as indicated by block 263, the location 265 where the sensed attribute was sensed, and a wide variety of other information 267.

Geographical correlation component 190 in crop care component 140 then correlates the forward and rearward information based upon their locations. This is indicated by block 262. For instance, it correlates the information acquired by forward UAV 104 with the information acquired by rearward UAV 154, so that the information corresponds to the same plot of ground on the field.

Difference map generation component 194 then generates a difference map indicative of a difference between the prescribed and actual crop care operation. This is indicated by block 264. For instance, if a particular set of chemicals at various concentrations were to be applied at different locations on the field, then the difference map will indicate whether, and how closely, the actual spraying operation conformed to the prescription.

Figure 8:
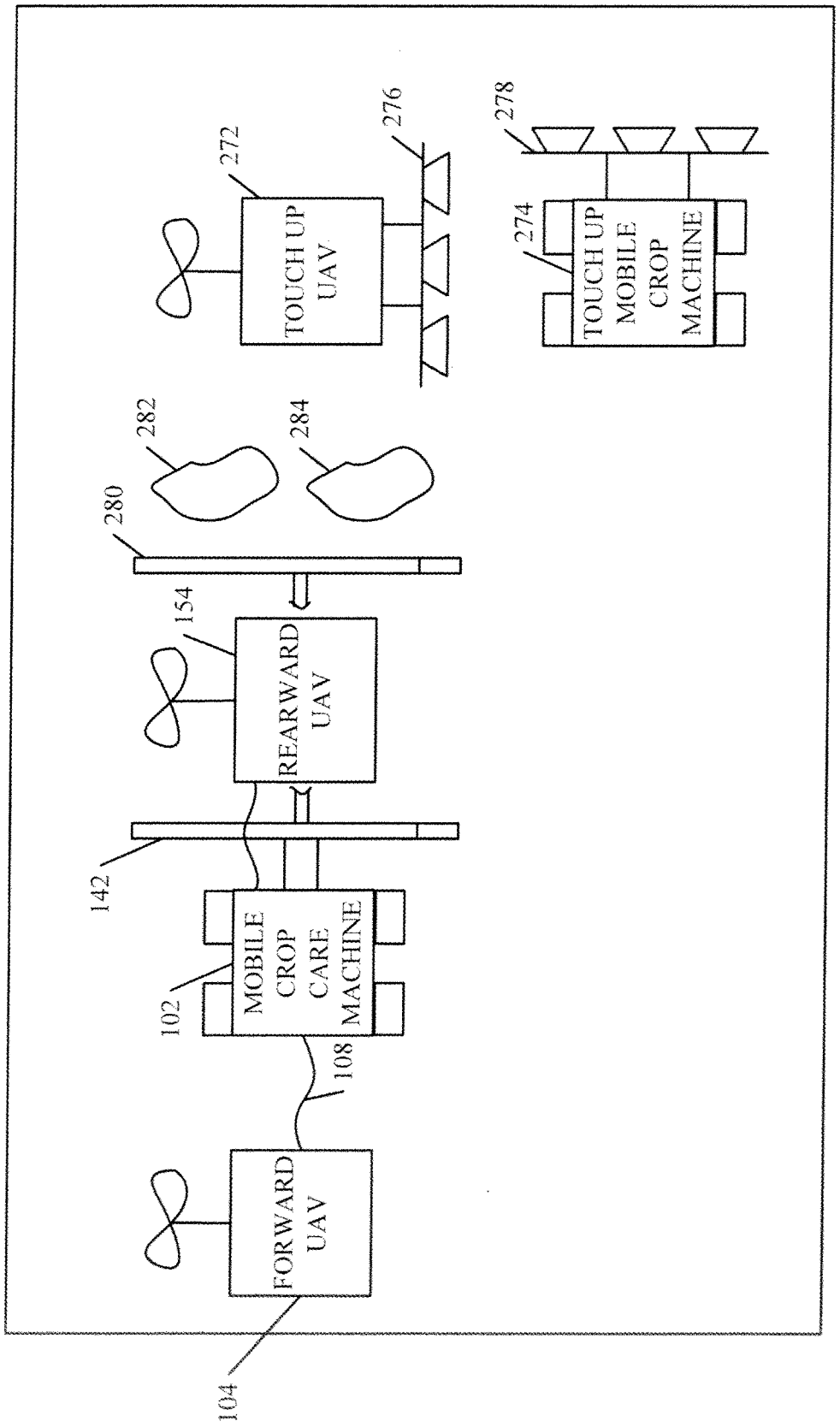
FIG. 8 is a block diagram illustrating the operation of a crop care machine architecture in using a difference map.

Difference map generation component 194 then outputs the difference map for use. This is indicated by block 266. The difference map can be used in a wide variety of different ways. It can be used by mobile crop care machine 102, itself. This is indicated by block 268. For example, machine 202 may have an additional controllable mechanism 280 (such as a second set of nozzles, that are deployed behind UAV 154 or a second towed sprayer or a chemical applicator). It can also be used to influence the operation of another mobile crop care machine. This is indicated by block 270. FIG. 8 illustrates one example of this.

It can be seen in FIG. 8 that a plurality of secondary mobile crop care machines 272-274 are provided that follow rearward UAV 154. Machine 272 is a touch-up UAV that includes a chemical applicator 276 that can be used to apply chemical to the field or worksite. Machine 274 is another ground-traveling machine 274, again with an applicator 278 that can be used to apply chemicals. Machines 272-274 may be manned, autonomous, semi-autonomous, or additional, tethered machines.

Based on the difference map, areas 282 and 284 are identified as needing touch-up. For example, it may be that the prescription was not followed precisely enough with respect to areas 282 and 284. In that case, the difference map (or some indication or metrics indicative of the difference map) can be provided to one or more machines 272-274 that can follow-up and spray additional chemicals on areas 282 and 284. In yet another example, rearward UAV 152, itself, has a chemical applicator can that can be used to treat spots 282 and 284 as well.

As one implementation, the difference map may have its vector regions or matrix elements classified for application of chemical as "adequate", "marginal", "deficient", etc. The deficient areas 282 and 284 may be identified by the processor as having enough economic or other interest to touch up. Deficient area 282 can be assigned to a touch-up UAV 272 which may apply chemical to bring the area into the "adequate" application status. Referring again to FIG. 7, the difference map may also be used to generate alerts or notifications for the user. This is indicated by block 290 in FIG. 7.

Figure 8A:
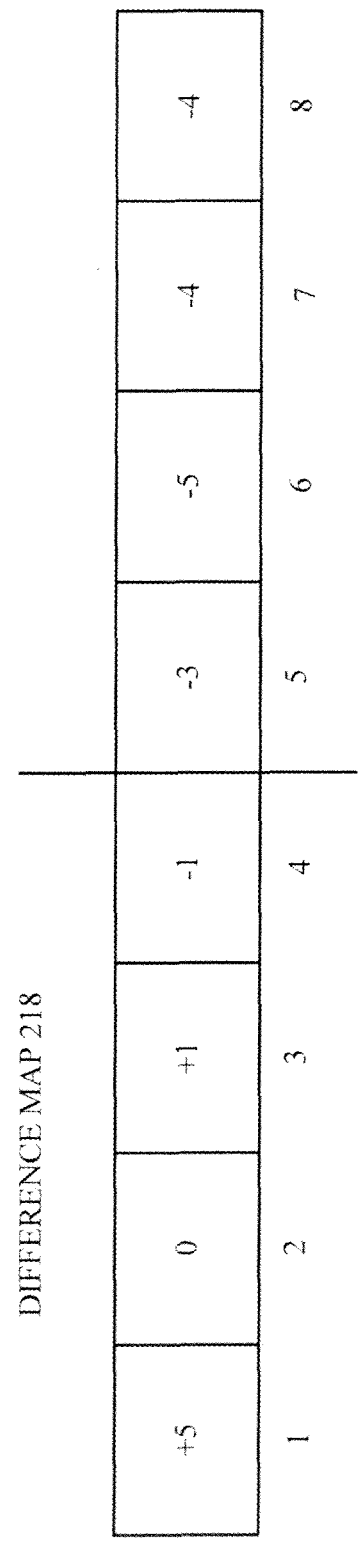
FIG. 8A shows one example of sensed values that can be used to generate a metric.

By way of example, it may be that a chemical marker (used to identify whether the application conformed to the prescription) may be expensive. Thus, it may not be continuously applied across the worksite (or field). In such cases, it may be applied to a diagnostic portion of the worksite or field, and actions can be taken based upon what occurred in the diagnostic portion. For instance, the difference map can include values that are used to generate an application metric that is indicative of the quality of the application (e.g., how closely it conformed to the prescription). As one example, each portion 160 for which data is acquired, and for which a prescription is generated, may be divided into sub-sections, and each sub-section may have a value indicating how well that actual application conformed to the prescription. FIG. 8A illustrates one example of a difference map for such a portion.

In the example shown in FIG. 8A, it is assumed that the controllable mechanism 142 is a sprayer that has 8 nozzles or sub-sections. Thus, the difference map includes a value corresponding to each nozzle or sub-section. The value generated for each portion of the difference map indicates whether a given chemical was over-applied, applied as prescribed, under-applied, etc. Thus, the eight values on the difference map shown in FIG. 8A are +5, 0, +1, −1, −3, −5, −4 and −4. The difference values can represent a percent (or other) deviation from prescription or another variable indicating how closely the actual application conformed to the prescription. The values can be used to generate an application metric.

For instance, the application metric can be generated by summing together all of the individual values in the difference map for a corresponding portion of the worksite. The sum may be a simple sum, a sum of absolute error values, a weighted sum, or any other metric. Once the metric is calculated, it can be compared to one or more alert thresholds. For instance, the alert thresholds may include a first threshold. If the metric is within the first threshold, then a notification can be generated indicating that the operation is being performed adequately. If the metric exceeds the first threshold, but is within a second threshold, that may indicate that the operation is being performed adequately, but is near the border of inadequate performance. In that case, a cautionary notification may be generated. If the metric exceeds the second threshold, this may generate a warning alert indicating that the process is being performed inadequately. Of course, there may be a wide variety of different numbers and types of thresholds to generate a wide variety of different types of alerts or notifications.

It should also be noted that the alerts and notifications can take a wide variety of different forms. They can be provided to a local operator or to a remote site. They can be visual communications (such as color-coded green, yellow, red, etc.). They can be audible (such as no sound, intermittent tone, continuous tone, etc.). They can be haptic (such as no seat or phone vibration, intermittent vibration, continuous vibration, etc.), or they can take any of a wide variety of other forms.

Referring again to FIG. 7, the difference map can be output to generate a visually observable quality map. This is indicated by block 292. The quality map may include, for instance, a geographical representation of the field, and visually observable identifiers indicating the quality of the crop care operation, as it was performed on each of the identified locations in the field. In another example, only the areas where the operation was performed insufficiently are identified. The quality map can take a wide variety of other forms as well.

Referring again to FIG. 7, the difference map can be used to perform other functions as well. For instance, it can be used to perform pattern identification 294 that may indicate problematic patterns. It can be used to perform error processing and error correction as indicated by block 296, and it can be used to identify machine problems and to generate correction indicators correcting those problems. Machine problems may include setup problems which indicate problems with respect to the configuration or setup of the machine, or they can indicate actual machine malfunctions. All of these are indicated by block 298.

Figure 9:
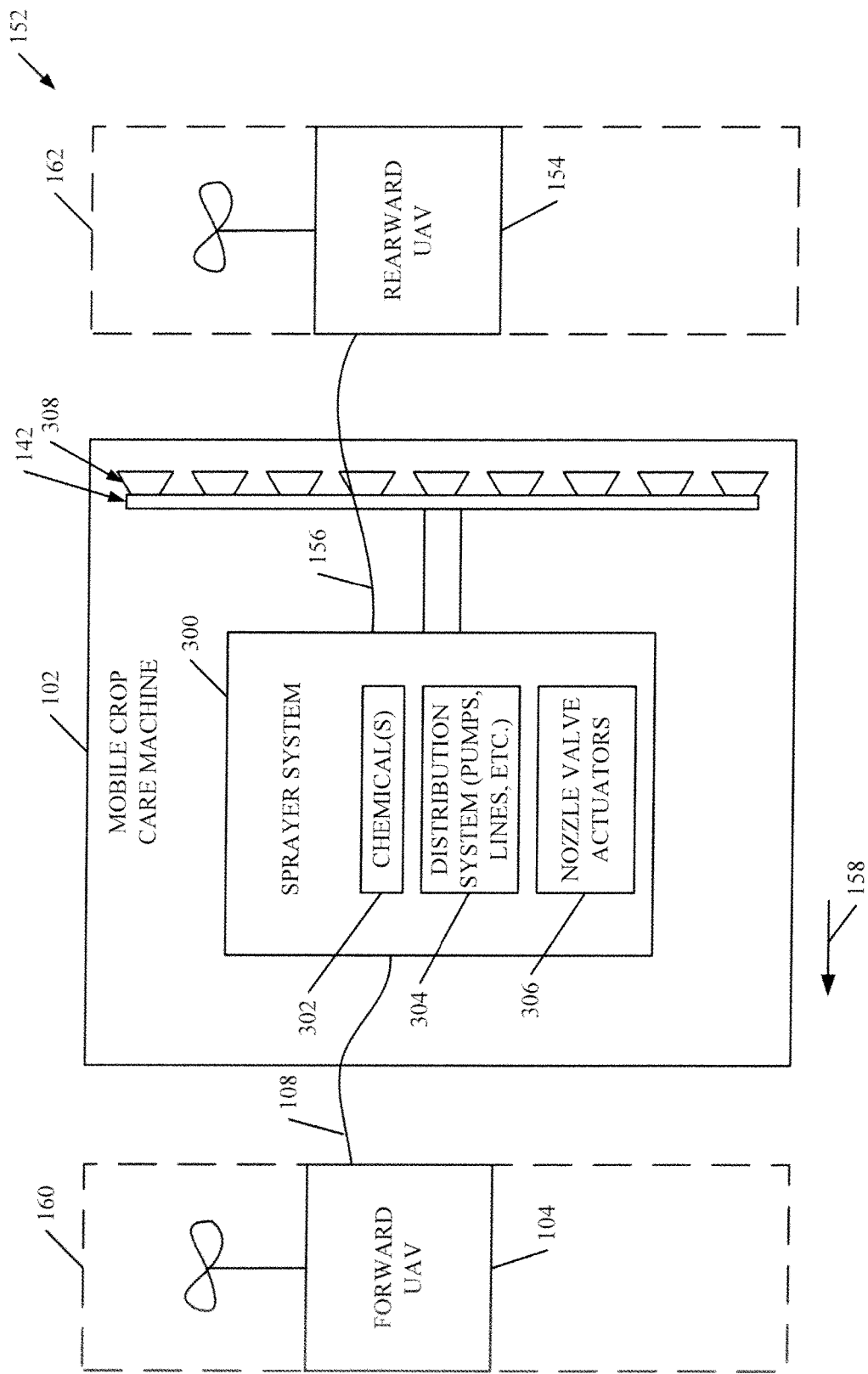
FIG. 9 is a block diagram illustrating one example of a more detailed implementation of the crop care machine architecture shown in FIG. 3.
Figure 10:
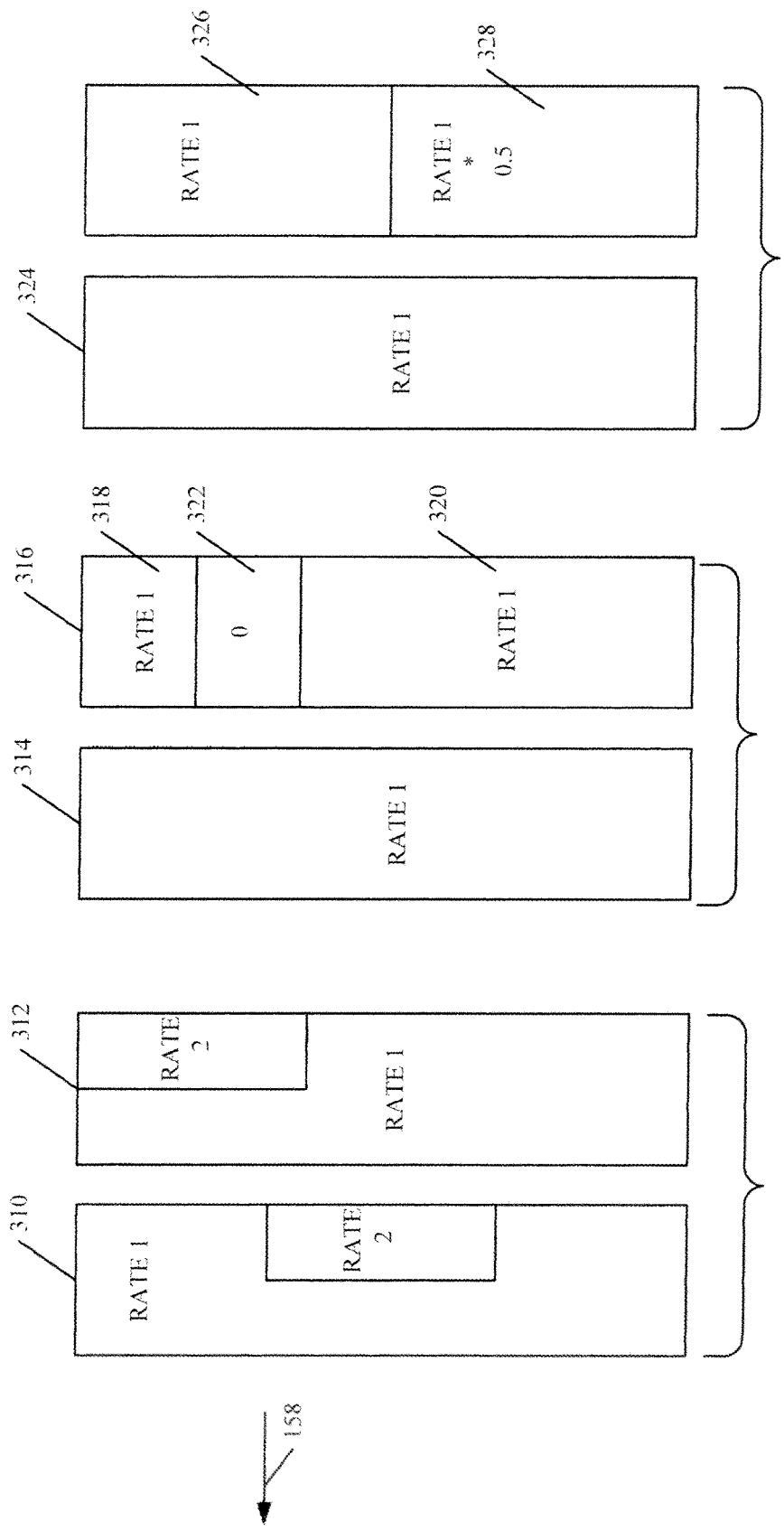
FIG. 10 (which includes FIGS. 10A, 10B and 10C) shows patterns that can be detected to identify errors or malfunctions.

FIGS. 9 and 10 will now be described to indicate number of examples of pattern identification 294, error processing and correction 296, and machine problem identification and correction 298. It will be noted that, in performing these types of processes, crop care controller 140 can collect supplemental information from collection system 198. A number of examples of this are described below as well.

FIG. 9 shows one example of architecture 152, in which some items are similar to those shown in FIG. 3, and they are similarly numbered. FIG. 9, however, shows that in the example discussed, machine 102 includes a sprayer mechanism 300 that includes chemical 302, a distribution system 304 (which can include such things as pumps, distribution lines, etc.) and a set of nozzle valve actuators 306. Controllable mechanism 142 includes an array of spray nozzles 308. Each nozzle may be individually controllable, or they may be controllable in segments. Nozzle valve actuators 306 control pumps and lines 304 to deliver one or more chemicals 302, in various concentrations, through each of the nozzles 308 to the corresponding portion of the field to be treated. Forward UAV 104 senses the attributes of portion 162 so that a prescription can be generated for chemical delivery to that portion, when machine 102 is over it. Rearward UAV 154 senses the quality of that application.

In some examples, application error may be related to a machine or environmental situation for which compensation can be performed to reduce application error. In that case, the difference map can be analyzed by corrective action system 200. For instance, problem identifying component 208 may identify patterns that indicate problems, and corrective action identifying component 210 can identify corrective actions that can be taken to mitigate or eliminate those problems. Components 208 and 210 can use information received from supplemental information collection system 198, as well.

As one example, the application error may be higher where there are significant cross winds. In such an example, the chemical may be blown in the direction of the cross winds, between the time it is discharged from the nozzles 308 and the time it reaches the crop to be treated. Thus, supplemental information collection system 198 may be a system that measures the wind speed and direction. This may be measured locally relative to machine 102, or it may be obtained from a nearby weather station, or otherwise. By considering the wind speed and direction, it may be that problem identifying component 208 and corrective action identifying component 210 identify that the blowing wind has spatially shifted the chemical from its prescribed location to a location that is displaced from the prescribed location by a distance that is proportional to (or otherwise related to) the wind vector. In that case, corrective action identifying component 210 may identify that a corrective action includes modifying which outlet locations (e.g., which nozzles 308) are used to apply the chemicals, and the timing of chemical release. For instance, with a certain wind vector, it may be determined to shift nozzle assignments 50 cm in one direction, and delay application for 500 ms (relative to the prescription that would be applied during a calm wind situation), for a given machine speed and direction. This will apply the chemical with less deviation from the prescribed application. FIG. 10 (which includes FIGS. 10A, 10B and 10C) illustrates this. FIG. 10 assumes the direction of travel of the machine relative to the illustrated portions is as shown by arrow 158.

FIG. 10A shows that, for one portion 160, the as-prescribed chemical application may be represented by 310. This indicates that, for a significant portion of the area being treated, a chemical application at rate 1 should be provided. However, for a relatively smaller portion near the center of the overall portion, the chemical should be applied at rate 2. When the rearward UAV 154 travels over the portion where the application was made, it senses a pattern of application indicated by 312. This indicates that the portion of application corresponding to rate 2 has shifted from the prescribed location. This (in conjunction with a wind vector, if one is used) may tend to indicate that the wind has affected the application. In that case, corrective action system 200 may identify the problem and correct future applications to accommodate the wind speed and direction.

FIG. 10B shows an example of a pattern that can be identified by corrective action system 200 to identify a machine malfunction. In FIG. 2B, numeral 314 indicates that the entire portion being treated should receive a chemical application at rate 1. However, numeral 316 shows the as-applied rate, as sensed by rearward UAV 154. It can be seen that there are two sections 318 and 320 that received the application at rate 1. However, there is also a section 322 that received no application. Because the direction of travel is indicated by arrow 158, section 322 may correspond to a nozzle that has failed or plugged. In that case, the operator can be notified immediately, and some indication as to the nature of the problem may be provided as well. For instance, a notification may be generated indicating that "nozzle 6 is plugged or has failed".

FIG. 10C also shows another pattern that can be used to identify a problem. Numeral 324 shows that the portion being treated is prescribed to receive the chemical at rate 1. However, the as-applied pattern shows that portion 326 received an application at rate 1, but portion 328 received an application at only half of rate 1. This indicates that a spray nozzle (or section) may have a reduced flow rate, but that it has not failed entirely. Where the pattern indicates that a nozzle applies a consistently low rate, relative to the prescription, then that nozzle may be controlled to apply X % more chemical to bring the as-applied rate closer to the prescribed rate.

In yet another example, these patterns may indicate that a pump supplying the chemical, or a valve regulating flow of the chemical, to a given section nozzle may be leaking. This can result in reduced application from that nozzle. The pattern may thus indicate a consistently low as-applied rate, relative to the prescription, for a nozzle or for a number of nozzles that are served by the given pump or valve. An appropriate alert or notification can be surfaced for the user.

Figure 11:
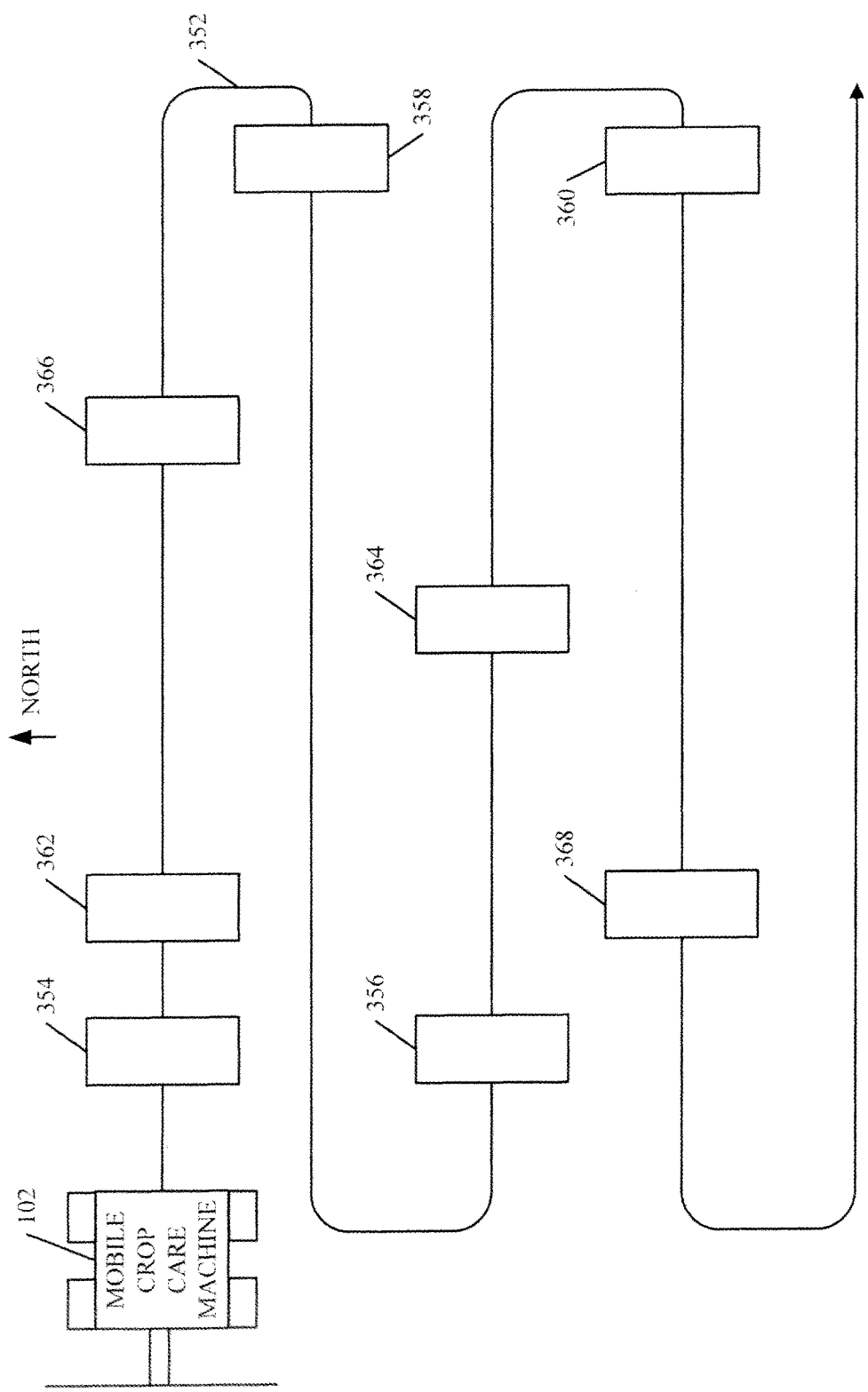
FIG. 11 is a block diagram of one example of a calibration path.

Referring again to the flow diagram of FIG. 7, the information generated by UAVs 104 and 154 (or by either of them) may also be used to perform calibration operations using diagnostic zone processing. This is indicated by block 350. FIG. 11 shows one example of this. FIG. 11 shows that, in order to reduce cost or to address other factors associated with a chemical marker, use of the chemical marker may be restricted to a set of diagnostic zones on the worksite. In FIG. 11, an a priori application path 352 may be calculated for machine 102. However, it may be that the machine only performs processing at a set of diagnostic zones along that path. The set of diagnostic zones may also be identified a priori or in situ, or using a combination of both a priori and in situ identification.

Some criteria that can be used to define the location of the diagnostic zones may include, for instance, wind direction, wind speed, application rate, application outlets used by prescription, etc. In FIG. 11, for instance, diagnostic zones 354 and 356 may be used for wind calibration when traveling in the East bound direction on FIG. 11. An application prescription can be generated for zone 354 and then the application can be applied and the as-applied pattern can be detected. Adjustments can be made based upon how well the as-applied pattern conforms to the prescription, and the same processing can be performed with respect to zone 356. Diagnostic zones 358 and 360 can be used for wind calibration when traveling west.

In another example, diagnostic zones 362 and 364 can be used to check high application rate component health and diagnostic zones 366 and 368 can be used to check low application rate component health. Additional diagnostic zones can be assigned based on field conditions. Such diagnostic zones can vary widely, based on individual field conditions and the particular crop care function being performed.

It should also be noted that the present architectures contemplate using machine 102 to perform multiple passes. For instance, on a first pass, a single UAV 104 may fly forward of machine 102. In the second pass, it may fly rearward of machine 102. In other examples, both forward and rearward UAVs are used, and the second pass of machine 104 is used to perform touch-up operations. All of these are contemplated herein.

Referring again to FIG. 7, a wide variety of post-operation analytics 351 can be performed on the data described herein. It can be done on machine 102 or sent to a remote server environment where the analytics are performed. The data can be consumed in other ways 353 as well.

Figure 12:
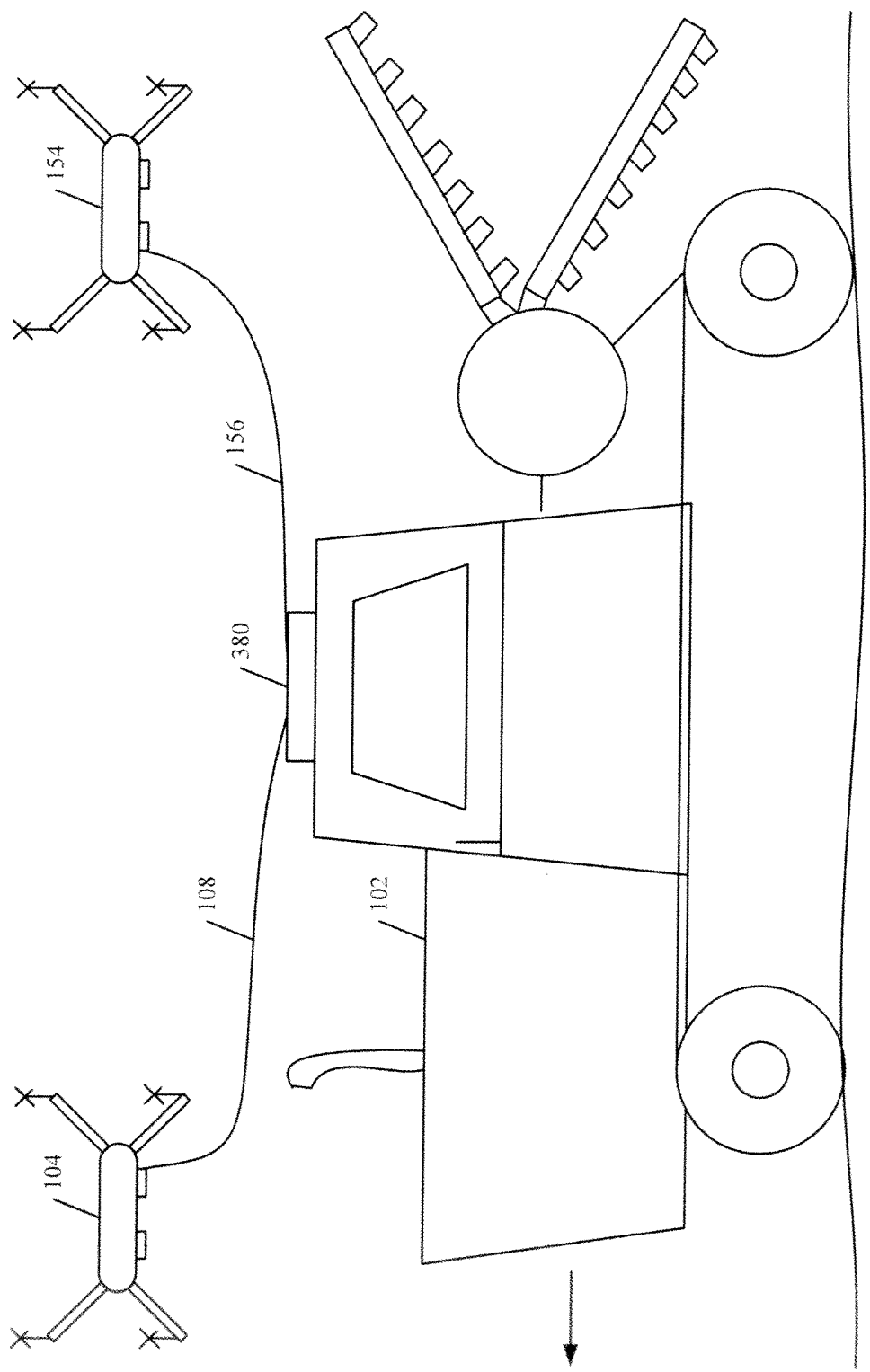
FIG. 12 is a pictorial diagram of one example the crop care machine architecture shown in FIG. 3, depicting a docking area.

FIG. 12 shows yet another example of machine 102. Machine 102 illustratively has forward UAV 104 and rearward UAV 154. They are illustratively tethered to machine 102 using physical tethers which represent links 108 and 156. FIG. 12 also illustrates that machine 102 is illustratively provided with a landing area (or docking area) 380. In the example shown in FIG. 12, docking area 380 illustratively includes an area for UAVs 104 and 154 to land or dock. They can include mechanical securing or plugging mechanisms that are automatically or manually actuated to secure UAVs 104 and 154 to machine 102. They can include power or battery charging docking elements, data transmission connectors, or other mechanical, electronic or electromagnetic components as well.

It can be seen that the present system provides real time, or near real time, control. Because the one or more UAVs provide data about the worksite at the same time that the mobile machine is operating on the worksite, this type of control can be achieved. This is true, regardless of whether UAVs simultaneously operate forward of, and rearward of, the mobile machine, or whether one UAV operates rearward of the mobile machine or alternates between operating forward and rearward of the mobile machine.

Embodiments of the present system advantageously have images with sufficient resolution in order to distinguish small items in the field.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the difference map or any of the other information can be output to a remote server environment.

Figure 13:
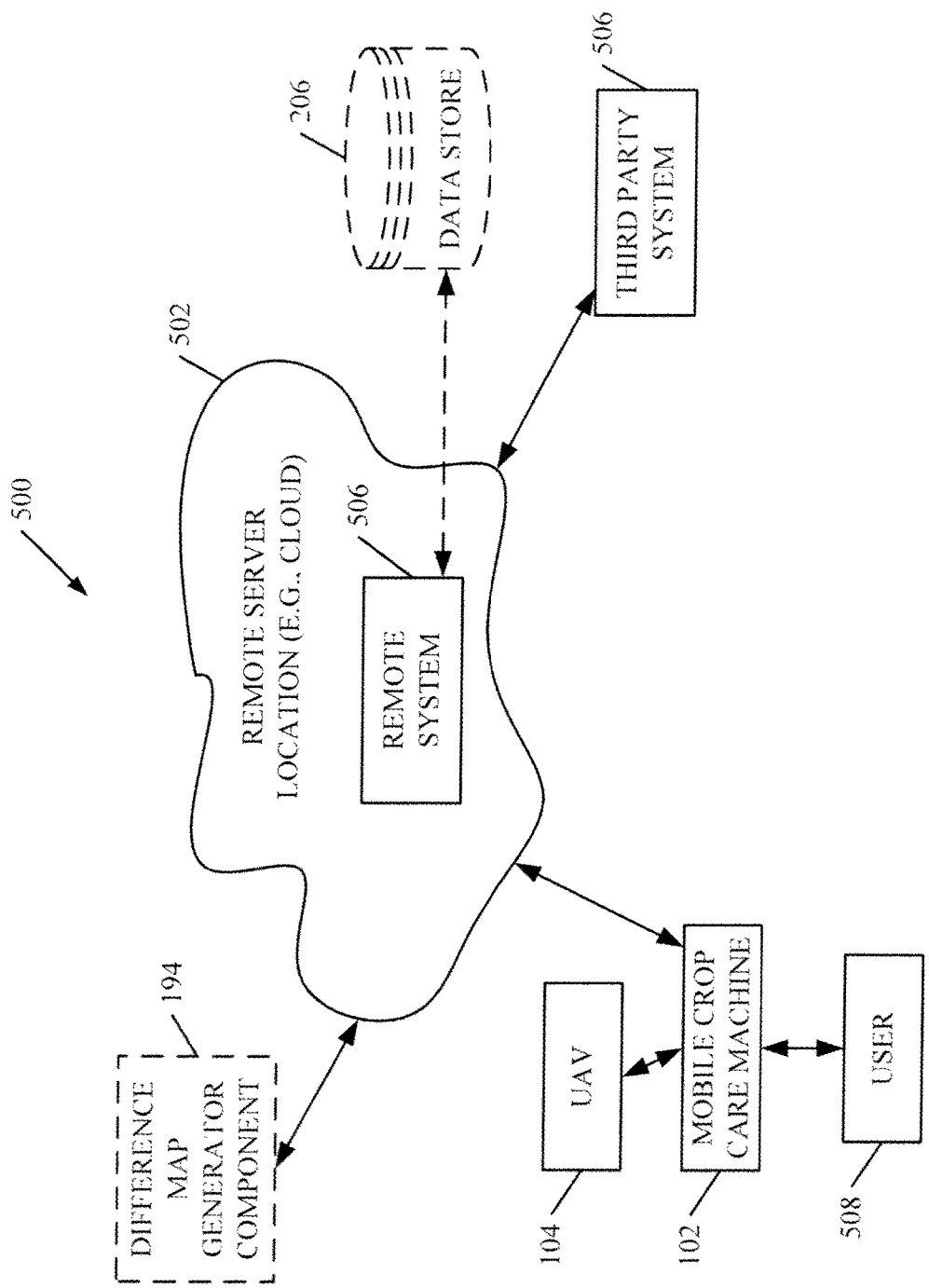
FIG. 13 shows one example of how information can be used in a remote server architecture.

FIG. 13 is a block diagram of machine 102, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in the previous Figures as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 13, some items are similar to those shown in previous Figures and they are similarly numbered. FIG. 13 specifically shows that crop care controller (or portions of it) and data store 206 can be located at a remote server location 502. Therefore, machine 102 accesses those systems through remote server location 502.

FIG. 13 also depicts another example of a remote server architecture. FIG. 13 shows that it is also contemplated that some elements are disposed at remote server location 502 while others are not. By way of example, data store 206 or a third party system 507 can be disposed at a location separate from location 502, and accessed through the remote server at location 502. Other parts of the machine 102 (e.g., parts of control system 140) can be stored at remote server location 502 or elsewhere. Regardless of where they are located, they can be accessed directly by machine 102, or user 508 through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As machine 102 (or any UAVs) comes close to the fuel truck for fueling, the system automatically collects the information from the machine (or UAV) using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on machine 102 until machine 102 enters a covered location. The machine 102, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 14:
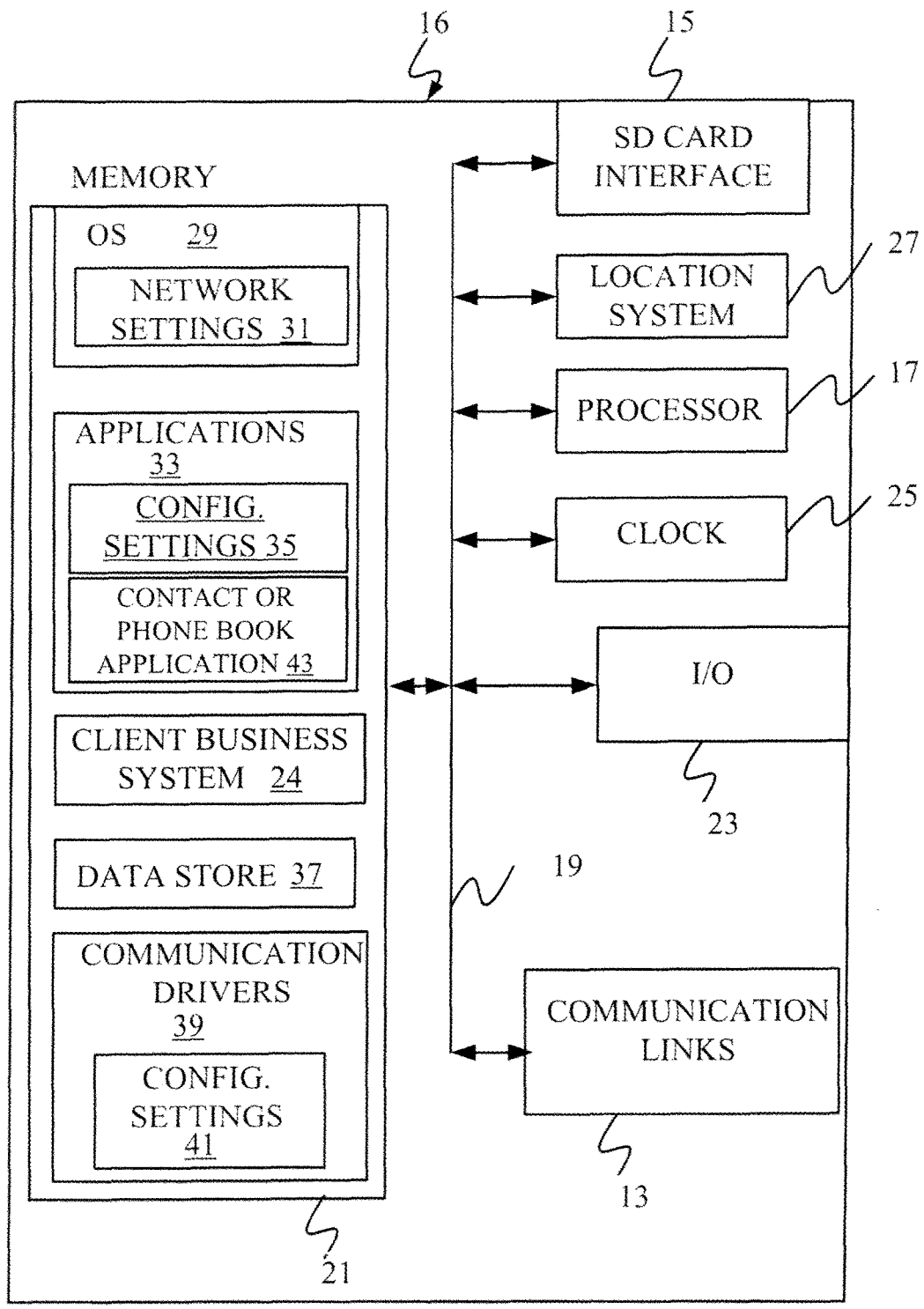
FIGS. 14-16 show examples of mobile devices that can be used in architectures shown above.
Figure 15:
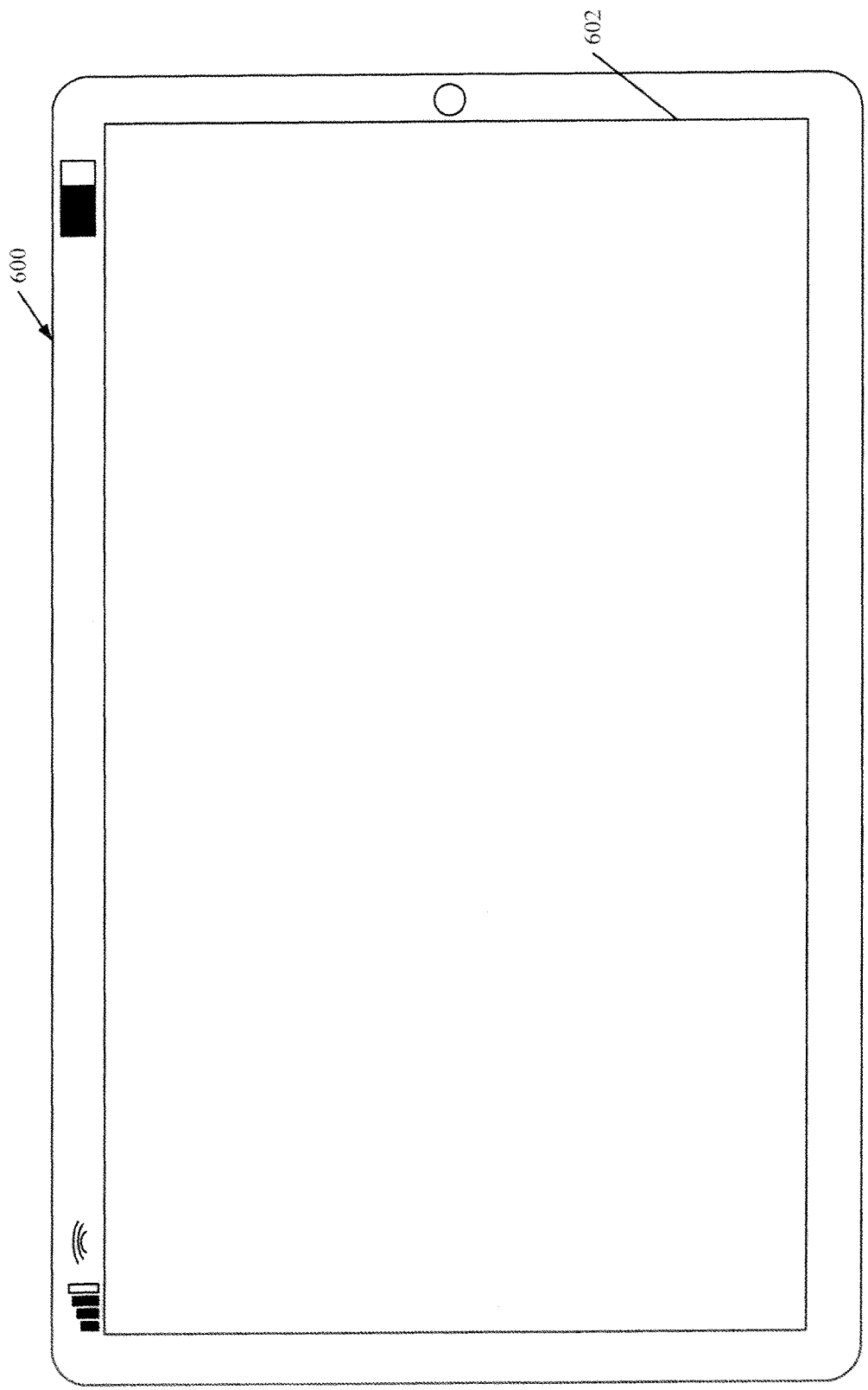
Figure 16:
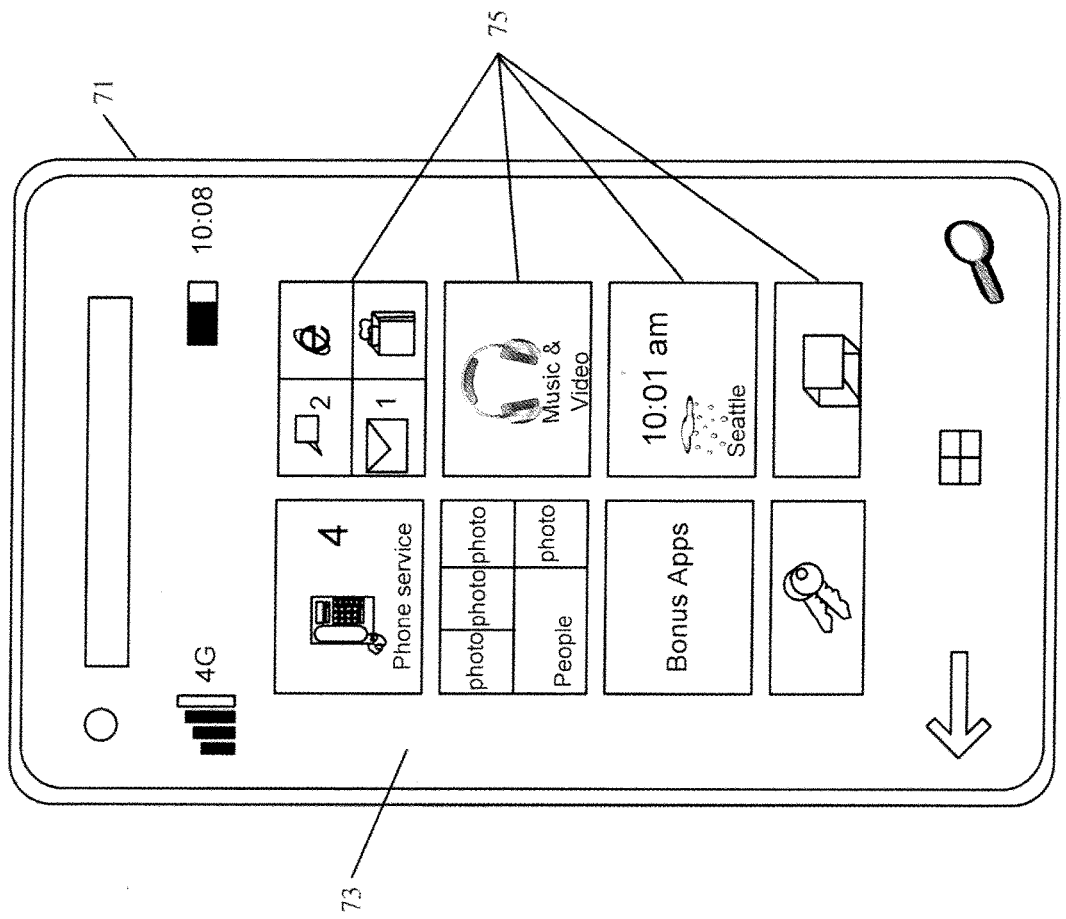

FIG. 14 is a simplified block diagram of one illustrative example of a handheld or mobile computing device that can be used as a user's or client's hand held device 16, in which the present system (or parts of it) can be deployed. For instance, a mobile device can be deployed in the operator compartment of machine 102 for use in generating, processing, or displaying the data. FIGS. 15-16 are examples of handheld or mobile devices.

FIG. 14 provides a general block diagram of the components of a client device 16 that can run some components shown in previous Figures, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous Figures) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 15 shows one example in which device 16 is a tablet computer 600. In FIG. 16, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc.

(hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 16 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 17:
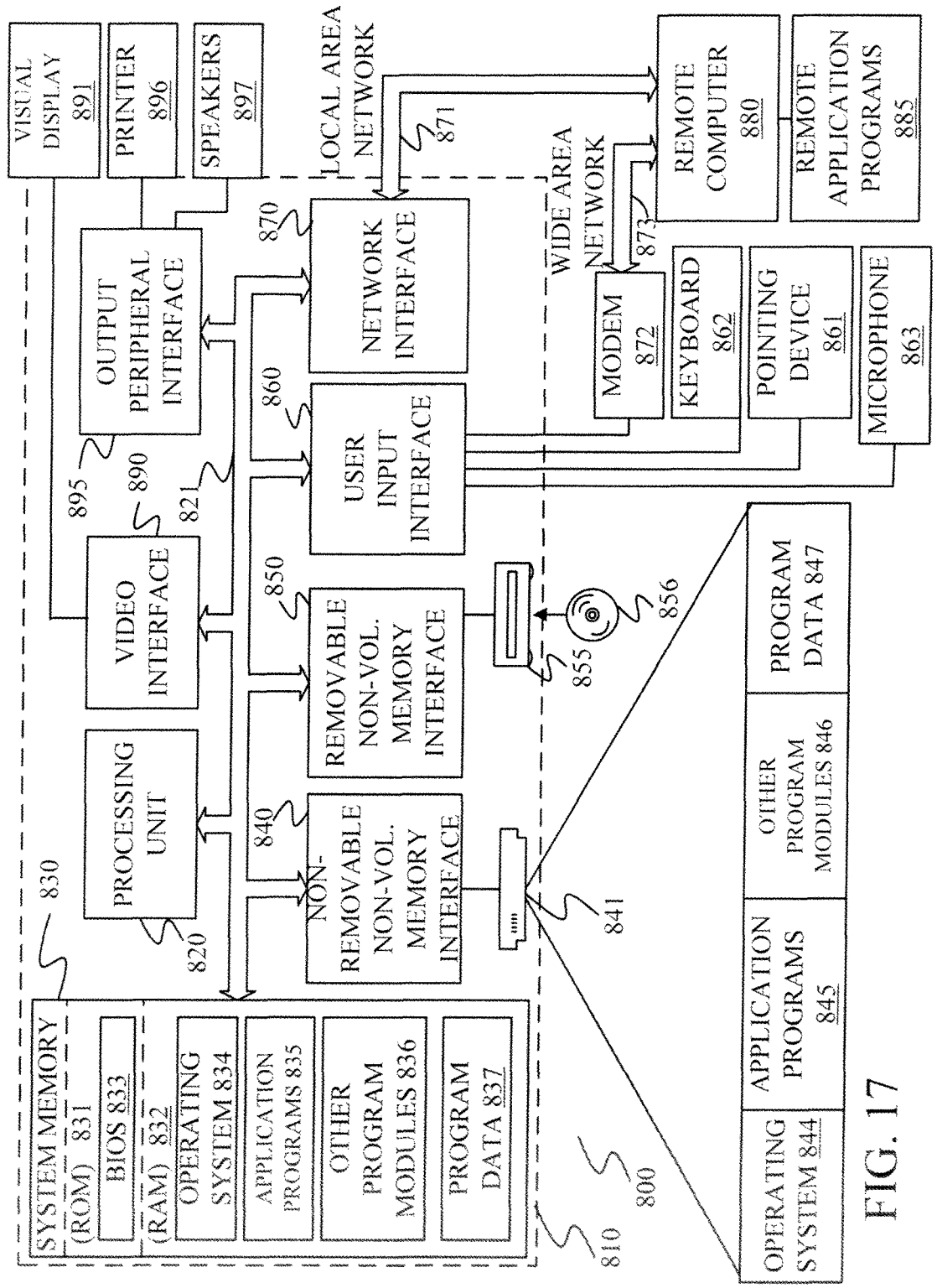
FIG. 17 shows an example of a computing environment that can be used in the architectures shown in previous Figures.

FIG. 17 is one example of a computing environment in which elements of the previous Figures, or parts of them, (for example), can be deployed. With reference to FIG. 17, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous Figures can be deployed in corresponding portions of FIG. 17.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 is typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile machine, comprising: a controllable mechanism that performs a prescribed operation on a worksite as the mobile machine travels over the worksite in a direction of travel; a communication system that receives attribute data indicative of an attribute corresponding to the worksite, and that receives effect data indicative of an effect of the prescribed operation being performed on the worksite; and a control system that generates a difference map indicative of a difference between the attribute data and the effect data, and that controls the controllable mechanism to adjust performance of the prescribed operation on the worksite, based on the difference.

Example 2 is the mobile machine of any or all previous examples, wherein the communication system is configured to receive, as the attribute data, data indicative of a sensed attribute of a location of the worksite, and as the effect data, data indicative of an effect of the prescribed operation on the location of the worksite rearward of the mobile machine in the direction of travel.

Example 3 is the mobile machine of any or all previous examples, wherein the communication system is configured to receive the effect data from a first unmanned aerial vehicle (UAV) positioned rearward of the mobile machine.

Example 4 is the mobile machine of any or all previous examples, wherein the communication system is configured to receive the attribute data from a second UAV positioned forward of the mobile machine.

Example 5 is the mobile machine of any or all previous examples, wherein the control system is configured to generate a set of difference values across a plurality of pre-defined geographical regions within the worksite, wherein each difference value, in the set of difference values, is indicative of a difference between the attribute data and the effect data within a particular geographical region of the worksite.

Example 6 is the mobile machine of any or all previous examples, wherein the control system is configured to generate a sum of the set of difference values across the worksite.

Example 7 is the mobile machine of any or all previous examples, wherein the control system compares the sum of the set of difference values to a threshold value corresponding to the prescribed operation.

Example 8 is the mobile machine of any or all previous examples, wherein the control system: based on the comparison, determines that the sum exceeds the threshold value; and based on the determination that the sum exceeds the threshold value, identifies a corrective action for the prescribed operation.

Example 9 is the mobile machine of any or all previous examples, wherein the control system automatically instructs the controllable mechanism to adjust performance of the prescribed operation on the worksite by implementing the corrective action.

Example 10 is the mobile machine of any or all previous examples, wherein the control system determines that the sum is within the threshold value, and based on the determination that the sum is within the threshold value, instructs the controllable mechanism to maintain performance of the prescribed operation.

Example 11 is a method of controlling a mobile machine, comprising: controlling a controllable mechanism to perform a prescribed operation on a worksite as the mobile machine travels over the worksite in a direction of travel; receiving attribute data indicative of an attribute corresponding to the worksite; receiving effect data indicative of an effect of the prescribed operation on the worksite; generating a difference value that represents a difference between the attribute data and the effect data; based on the difference value, identifying a problem and a corrective action that mitigates the identified problem; and automatically controlling the controllable mechanism to adjust the prescribed operation by implementing the corrective action.

Example 12 is the method of controlling a mobile machine or all previous examples, further comprising: obtaining geographical information associated with performance of the prescribed operation in the direction of travel; and identifying a set of geographical areas within the worksite using the geographical information.

Example 13 is the method of controlling a mobile machine or all previous examples, wherein receiving attribute data and effect data comprises: receiving attribute data and effect data for each of the geographical areas within the worksite.

Example 14 is the method of controlling a mobile machine or all previous examples, wherein generating a difference value comprises: generating a difference map representing a set of calculated difference values, each calculated difference value corresponding to a difference between the attribute data and the effect data for a particular one of the geographical areas within the worksite.

Example 15 is the method of controlling a mobile machine or all previous examples, wherein identifying a problem comprises: comparing the difference value to a threshold value; and determining whether the difference value exceeds the threshold value.

Example 16 is the method of controlling a mobile machine or all previous examples, wherein generating a difference value comprises: generating a summary difference value indicative of a sum of the set of calculated difference values across the set of geographical areas.

Example 17 is the method of controlling a mobile machine or all previous examples, wherein identifying a problem comprises: identifying a threshold value corresponding to the prescribed operation; comparing the summary difference value to the threshold value; determining that the summary difference value exceeds the threshold value; based on the determination that the summary difference value exceeds the threshold value, selecting a corrective action from a plurality of pre-defined corrective actions; and automatically controlling the controllable mechanism to adjust the prescribed operation by implementing the selected corrective action.

Example 18 is the method of controlling a mobile machine or all previous examples, further comprising: identifying whether the problem includes at least one of a calibration problem or a malfunctioning problem; if the problem includes a calibration problem, implementing the corrective action by automatically adjusting the direction of travel of the mobile machine across the worksite; and if the problem includes a malfunctioning problem, implementing the corrective action by identifying a portion of the controllable mechanism associated with the malfunctioning problem and automatically controlling the controllable mechanism to adjust performance of the prescribed operation relative to the portion identified.

Example 19 is a mobile machine comprising: a controllable mechanism that performs a prescribed operation on a worksite as the mobile machine travels across the worksite in a direction of travel; a communication system that receives attribute data indicative of an attribute of the worksite, and that receives effect data indicative of an effect of the prescribed operation being performed, by the controllable mechanism, on the worksite; and a control system that comprises: a difference map generation component configured to generate particular difference values between the attribute data and the effect data for each area, of a set of pre-defined areas, within the worksite, and generate a difference map that includes a summary difference value, wherein the summary difference value represents a sum of the particular difference values across the set of pre-defined areas within the worksite; and a corrective action system configured to determine that the summary difference value exceeds an alert threshold value for the prescribed operation, based on the determination, identify a corrective action for the prescribed operation, and automatically control the controllable mechanism to adjust performance of the prescribed operation on the worksite by implementing the corrective action.

Example 20 is the mobile machine of any or all previous examples, wherein the controllable mechanism comprises a sprayer implement and the prescribed operation comprises a spraying operation performed on a crop in the worksite, and wherein: the communication system receives attribute data indicative of a prescribed metric of the spraying operation, and receives effect data indicative of a quality of the spraying operation relative to the crop; wherein the particular difference values represent deviation of the quality of the spraying operation from the prescribed metric of the spraying operation; and wherein the corrective action adjusts the sprayer implement to reduce deviation of the quality of the spraying operation form the prescribed metric of the spraying operation during subsequent performance of the spraying operation by the sprayer implement.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine comprising:
   a controllable mechanism that performs a prescribed operation on a location of a worksite as the mobile machine travels over the location in a direction of travel;
   a communication system that receives attribute data indicative of an attribute corresponding to the location, and receives effect data indicative of an effect of the prescribed operation on the location of the worksite rearward of the mobile machine in the direction of travel; and
   a control system that generates a difference map indicative of a difference between the attribute data and the effect data, and controls the controllable mechanism to adjust performance of the prescribed operation on the location, based on the difference.

2. The mobile machine of claim 1, wherein the communication system is configured to receive, as the attribute data, data indicative of a sensed attribute of the location of the worksite forward of the mobile machine in the direction of travel.

3. The mobile machine of claim 1, wherein the communication system is configured to receive the effect data from a first unmanned aerial vehicle (UAV) positioned rearward of the mobile machine.

4. The mobile machine of claim 1, wherein the communication system is configured to receive the attribute data from a second UAV positioned forward of the mobile machine.

5. The mobile machine of claim 1, wherein the control system is configured to generate a set of difference values across a plurality of pre-defined geographical regions within the worksite, wherein each difference value, in the set of difference values, is indicative of a difference between the attribute data and the effect data within a particular geographical region of the worksite.

6. The mobile machine of claim 5, wherein the control system is configured to generate a sum of the set of difference values across the worksite.

7. The mobile machine of claim 6, wherein the control system compares the sum of the set of difference values to a threshold value corresponding to the prescribed operation.

8. The mobile machine of claim 7, wherein the control system:
   based on the comparison, determines that the sum exceeds the threshold value; and
   based on the determination that the sum exceeds the threshold value, identifies a corrective action for the prescribed operation.

9. The mobile machine of claim 8, wherein the control system automatically instructs the controllable mechanism to adjust performance of the prescribed operation on the worksite by implementing the corrective action.

10. The mobile machine of claim 7, wherein the control system determines that the sum is within the threshold value, and based on the determination that the sum is within the threshold value, instructs the controllable mechanism to maintain performance of the prescribed operation.

11. A method of controlling a mobile machine, comprising:
    controlling a controllable mechanism to perform a prescribed operation on a location at a worksite as the mobile machine travels over the location in a direction of travel;
    receiving attribute data indicative of an attribute corresponding to the location;
    receiving effect data indicative of an effect of the prescribed operation on the location rearward of the mobile machine in the direction of travel;
    generating a difference value that represents a difference between the attribute data and the effect data;
    based on the difference value, identifying a problem and a corrective action that mitigates the identified problem; and
    automatically controlling the controllable mechanism to adjust the prescribed operation by implementing the corrective action.

12. The method of controlling a mobile machine of claim 11, further comprising:
    obtaining geographical information associated with performance of the prescribed operation in the direction of travel; and
    identifying a set of geographical areas within the worksite using the geographical information.

13. The method of controlling a mobile machine of claim 12, wherein receiving attribute data and effect data comprises:

receiving attribute data and effect data for each of the geographical areas within the worksite.

14. The method of controlling a mobile machine of claim 13, wherein generating a difference value comprises:

generating a difference map representing a set of calculated difference values, each calculated difference value corresponding to a difference between the attribute data and the effect data for a particular one of the geographical areas within the worksite.

15. The method of controlling a mobile machine of claim 14, wherein generating a difference value comprises:

generating a summary difference value indicative of a sum of the set of calculated difference values across the set of geographical areas.

16. The method of controlling a mobile machine of claim 15, wherein identifying a problem comprises:

identifying a threshold value corresponding to the prescribed operation;
comparing the summary difference value to the threshold value;
determining that the summary difference value exceeds the threshold value;
based on the determination that the summary difference value exceeds the threshold value, selecting a corrective action from a plurality of pre-defined corrective actions; and
automatically controlling the controllable mechanism to adjust the prescribed operation by implementing the selected corrective action.

17. The method of controlling a mobile machine of claim 11, wherein identifying a problem comprises:

comparing the difference value to a threshold value; and
determining whether the difference value exceeds the threshold value.

18. The method of controlling a mobile machine of claim 11, further comprising:

identifying whether the problem includes at least one of a calibration problem or a malfunctioning problem;
if the problem includes a calibration problem, implementing the corrective action by automatically adjusting the direction of travel of the mobile machine across the worksite; and
if the problem includes a malfunctioning problem, implementing the corrective action by identifying a portion of the controllable mechanism associated with the malfunctioning problem and automatically controlling the controllable mechanism to adjust performance of the prescribed operation relative to the portion identified.

19. A mobile machine comprising:

a controllable mechanism that performs a prescribed operation on a worksite as the mobile machine travels across the worksite in a direction of travel;

a communication system that receives attribute data indicative of an attribute of the worksite, that receives an expected effect of the prescribed operation on the worksite, wherein the expected effect is expected based on the attribute of the worksite, and that receives effect data indicative of an effect of the prescribed operation being performed, by the controllable mechanism, on the worksite; and a control system that comprises:

a difference map generation component configured to generate particular difference values between the expected effect and the effect data for each area, of a set of pre-defined areas, within the worksite, and generate a difference map that includes a summary difference value, wherein the summary difference value represents a sum of the particular difference values across the set of pre-defined areas within the worksite; and a corrective action system configured to determine that the summary difference value exceeds an alert threshold value for the prescribed operation, based on the determination, identify a corrective action for the prescribed operation, and automatically control the controllable mechanism to adjust performance of the prescribed operation on the worksite by implementing the corrective action.

20. The mobile machine of claim 19, wherein the controllable mechanism comprises a sprayer implement and the prescribed operation comprises a spraying operation performed on a crop in the worksite, and wherein:

the communication system receives attribute data indicative of a prescribed metric of the spraying operation, wherein the expected effect of the prescribed operation is defined based on the prescribed metric being expectedly applied to the worksite, and receives effect data indicative of a quality of the spraying operation relative to the crop;

wherein the particular difference values represent deviation of the quality of the spraying operation from the prescribed metric of the spraying operation; and wherein the corrective action adjusts the sprayer implement to reduce deviation of the quality of the spraying operation form the prescribed metric of the spraying operation during subsequent performance of the spraying operation by the sprayer implement.

\* \* \* \* \*